(12) United States Patent
Lee et al.

(10) Patent No.: US 12,361,862 B2
(45) Date of Patent: Jul. 15, 2025

(54) DRIVING CIRCUIT, DISPLAY DEVICE INCLUDING THE DRIVING CIRCUIT, AND METHOD OF DRIVING THE SAME

(71) Applicant: SAMSUNG DISPLAY CO., LTD., Yongin-si (KR)

(72) Inventors: Il Ho Lee, Yongin-si (KR); Ye Rin Oh, Yongin-si (KR); Seung Rok Lee, Yongin-si (KR); Wan Kee Jun, Yongin-si (KR); Hyeon Seo Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/614,825

(22) Filed: Mar. 25, 2024

(65) Prior Publication Data
US 2025/0022402 A1    Jan. 16, 2025

(30) Foreign Application Priority Data
Jul. 13, 2023 (KR) .......................... 10-2023-0091357

(51) Int. Cl.
*G09G 3/20* (2006.01)
*G06F 3/041* (2006.01)

(52) U.S. Cl.
CPC ......... *G09G 3/2096* (2013.01); *G06F 3/0412* (2013.01); *G06F 3/04184* (2019.05); *G09G 2300/0426* (2013.01); *G09G 2300/0842* (2013.01)

(58) Field of Classification Search
CPC .............. G06F 3/04166; G06F 3/0446; G06F 3/04184; G06F 3/0412; G09G 3/2096; G09G 2300/0426; G09G 2300/0842
See application file for complete search history.

(56) References Cited

U.S. PATENT DOCUMENTS

| | | |
|---|---|---|
| 11,262,861 B2 | 3/2022 | Park et al. |
| 11,416,100 B2 | 8/2022 | Lim |
| 11,614,834 B2 | 3/2023 | Cho et al. |
| 2021/0132719 A1* | 5/2021 | Park ................. H10K 50/84 |
| 2022/0019332 A1 | 1/2022 | Ko et al. |
| 2023/0176689 A1 | 6/2023 | Lee et al. |

FOREIGN PATENT DOCUMENTS

| | | |
|---|---|---|
| KR | 10-2020-0119143 | 10/2020 |
| KR | 10-2022-0017330 | 2/2022 |
| KR | 10-2022-0058712 | 5/2022 |
| KR | 10-2022-0141365 | 10/2022 |

* cited by examiner

*Primary Examiner* — Yaron Cohen
(74) *Attorney, Agent, or Firm* — F. CHAU & ASSOCIATES, LLC

(57) ABSTRACT

A driving circuit includes: a display driver configured to generate a vertical synchronization signal; and a sensor driver configured to determine a driving frequency by using the vertical synchronization signal, wherein a pulse polarity of the vertical synchronization signal is inverted when the driving frequency is changed.

20 Claims, 26 Drawing Sheets

DRIVING CIRCUIT, DISPLAY DEVICE INCLUDING THE DRIVING CIRCUIT, AND METHOD OF DRIVING THE SAME

CROSS-REFERENCE TO RELATED APPLICATION

This application claims priority under 35 U.S.C. § 119 (a) to Korean Patent Application No. 10-2023-0091357, filed on Jul. 13, 2023, the disclosure of which is incorporated by reference herein in its entirety.

TECHNICAL FIELD

The present invention relates to a driving circuit, a display device including the driving circuit, and a method of driving the same.

DISCUSSION OF THE RELATED ART

As information technology develops, a usefulness of a display device, which is a connection medium between a user and information, increases. In response to this, a use of a display device such as a liquid crystal display device and an organic light emitting display device is increasing.

Generally, the display device may include a display unit for displaying an image and a sensor unit for sensing a touch position. The display unit displays a predetermined image in response to a driving signal supplied from a display driver, and the sensor unit senses an external input in response to a touch signal supplied from a sensor driver. Here, a frequency of the touch signal may be set so that interference with a frequency of the driving signal does not occur.

SUMMARY

According to an embodiment of the present invention, a driving circuit includes: a display driver configured to generate a vertical synchronization signal; and a sensor driver configured to determine a driving frequency by using the vertical synchronization signal, wherein a pulse polarity of the vertical synchronization signal is inverted when the driving frequency is changed.

In an embodiment of the present invention, the display driver includes: a display oscillator configured to generate a display clock signal; and a signal generator configured to generate the vertical synchronization signal by using a control signal that is supplied from an outside and the display clock signal.

In an embodiment of the present invention, the pulse polarity of the vertical synchronization signal is changed from a logic high level to a logic low level when the driving frequency is changed from a first frequency to a second frequency, and the pulse polarity of the vertical synchronization signal is changed from a logic low level to a logic high level when the driving frequency is changed from the second frequency to a third frequency.

In an embodiment of the present invention, a width of a first pulse is controlled in response to the changed driving frequency when the pulse polarity of the vertical synchronization signal is inverted.

In an embodiment of the present invention, the width of the first pulse is set to be wider as the driving frequency increases.

In an embodiment of the present invention, the width of the first pulse is set to be narrower as the driving frequency increases.

In an embodiment of the present invention, the sensor driver includes: a polarity determining circuit configured to determine the pulse polarity of the vertical synchronization signal; a frequency determining circuit configured to generate a counting signal by counting the width of the first pulse when the polarity determining circuit determines that the pulse polarity of the vertical synchronization signal is inverted; a touch controller configured to determine the driving frequency by using at least one of the pulse polarity of the vertical synchronization signal determined by the polarity determining circuit or a count value included in the counting signal, and generate signals corresponding to the driving frequency; and a sensor oscillator configured to supply a sensor clock signal to the frequency determining circuit.

In an embodiment of the present invention, the polarity determining circuit generates a maintenance control signal when the pulse polarity of the vertical synchronization signal is maintained, and generates a change control signal when the pulse polarity of the vertical synchronization signal is inverted.

In an embodiment of the present invention, the frequency determining circuit generates the counting signal when the change control signal is input.

In an embodiment of the present invention, the touch controller determines that the driving frequency is the same as before when the maintenance control signal is input, and determines a changed driving frequency by using the count value when the counting signal is input.

According to an embodiment of the present invention, a display device includes: a display unit including pixels connected to scan lines and data lines; a sensor unit including first sensors and second sensors to sense an external input; a display driver configured to supply a data signal to the pixels and generate a vertical synchronization signal by using a control signal that is supplied from an outside; and a sensor driver configured to determine a driving frequency by using the vertical synchronization signal and supply a touch signal to at least one of the first sensors and the second sensors in response to the determined driving frequency, wherein a pulse polarity of the vertical synchronization signal is inverted when the driving frequency is changed.

In an embodiment of the present invention, the display driver includes: a display oscillator configured to generate a display clock signal; and a signal generator configured to generate the vertical synchronization signal by using a control signal that is supplied from the outside and the display clock signal.

In an embodiment of the present invention, a width of a first pulse is controlled in response to the changed driving frequency when the pulse polarity of the vertical synchronization signal is inverted.

In an embodiment of the present invention, the width of the first pulse is set to be wider as the driving frequency increases.

In an embodiment of the present invention, the width of the first pulse is set to be narrower as the driving frequency increases.

In an embodiment of the present invention, the sensor driver includes: a polarity determining circuit configured to determine the pulse polarity of the vertical synchronization signal; a frequency determining circuit configured to generate a counting signal by counting the width of the first pulse when the polarity determining circuit determines that the pulse polarity of the vertical synchronization signal is inverted; a touch controller configured to determine the driving frequency by using at least one of the pulse polarity of the vertical synchronization signal that is determined by the polarity determining circuit and a count value included in the counting signal; and a sensor oscillator configured to supply a sensor clock signal to the frequency determining circuit.

In an embodiment of the present invention, the touch controller determines a changed driving frequency by using the count value when the counting signal is input.

According to an embodiment of the present invention, a method of driving a display device includes: generating, by using a display driver, a vertical synchronization signal, of which a pulse polarity is inverted when a driving frequency is changed, wherein the display driver drives pixels that are included in a display unit; and receiving, by using the sensor driver, the vertical synchronization signal from the display driver, and determining the driving frequency by using a width of a first pulse when the pulse polarity of the vertical synchronization signal is inverted, wherein the sensor driver drives sensors that are included in a sensor unit.

In an embodiment of the present invention, the width of the first pulse is set to be wider as the driving frequency increases.

In an embodiment of the present invention, the width of the first pulse is set to be narrower as the driving frequency increases.

BRIEF DESCRIPTION OF THE DRAWINGS

The above and other features of the present invention will become more apparent by describing in further detail exemplary embodiments thereof with reference to the accompanying drawings, in which.

DETAILED DESCRIPTION OF THE EMBODIMENT

Figure 1:
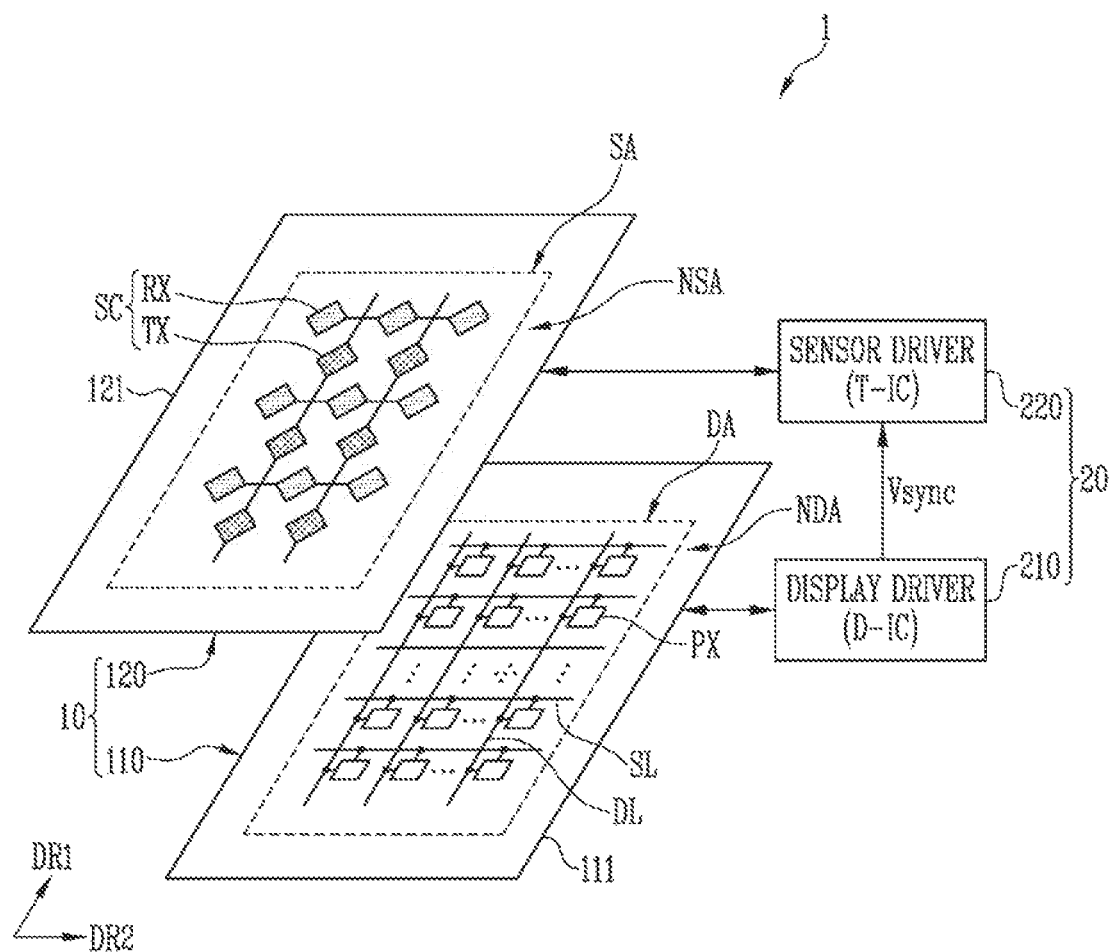
FIG. 1 is a diagram illustrating a display device according to embodiments of the present invention.

Hereinafter, various embodiments of the disclosure will be described in detail with reference to the accompanying drawings. The present invention may be implemented in various different forms and is not limited to the embodiments described herein.

It is to be understood that the same or similar elements are denoted by the same reference numerals throughout the specification and drawings, and thus, redundant descriptions may be omitted or briefly discussed. Therefore, the above-described reference numerals may be used in other drawings.

In the drawings, various thicknesses, lengths, and angles are shown and while the arrangement shown does indeed represent an embodiment of the present disclosure, it is to be understood that modifications of the various thicknesses, lengths, and angles may be possible within the spirit and scope of the present disclosure and the present disclosure is not necessarily limited to the particular thicknesses, lengths, and angles shown In addition, an expression "the same" in the description may mean "substantially the same".

Some embodiments of the present invention are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments of the present invention, the block, unit, and/or module may be physically separated into two or more interact individual blocks, units, and/or modules without departing from the scope of the present invention. In addition, in some embodiments of the present invention, the block, unit and/or module may be physically combined into more complex blocks, units, and/or modules without departing from the spirit and scope of the present invention.

A term "connection" between two configurations or elements may include an electrical connection and a physical connection, but the term is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit and scope of the present invention. The singular expression includes the plural expression unless the context clearly dictates otherwise.

In addition, the present invention is not limited to the embodiments disclosed below, and may be modified in various forms. In addition, each of the embodiments of the present invention disclosed below may be implemented alone or in combination with at least one of other embodiments of the present invention.

FIG. 1 is a diagram illustrating a display device according to embodiments of the present invention.

Referring to FIG. 1, the display device 1 includes a panel 10 and a driving circuit 20 for driving the panel 10. In addition, the display device 1 may further include an application processor which may be connected to the application processor.

The panel 10 may include a display unit 110, which is for displaying an image, and a sensor unit 120, which is for sensing touch, pressure, fingerprint, hovering, biometric information (or a biometric characteristic), and the like. For example, the panel 10 may include pixels PX and sensors SC positioned to overlap at least a portion of the pixels PX. In an embodiment of the present invention, the sensors SC may include first sensors TX (or a driving electrode) and second sensors RX (or a sensing electrode). In an embodiment of the present invention (for example, in a self-capacitance mode), the sensors SC may be configured as one type of sensors without distinction between the first sensors TX and the second sensors RX.

The driving circuit 20 may include a display driver 210 (D-IC) for driving the display unit 110 and a sensor driver 220 (T-IC) for driving the sensor unit 120. For example, the pixels PX may display an image in a display frame period unit. For example, the sensors SC may sense an input of a user in a sensing frame period unit. A sensing frame period and a display frame period may be independent of each other and may be different from each other. The sensing frame period and the display frame period may be synchronized with each other or may be asynchronous.

According to an embodiment of the present invention, the display unit 110 and the sensor unit 120 may be separately manufactured, and then disposed and/or combined so that at least one area overlaps. In addition, in an embodiment of the present invention, the display unit 110 and the sensor unit 120 may be integrally manufactured with each other. For example, the sensor unit 120 may be directly formed on at least one substrate configuring the display unit 110 (for example, an upper substrate and/or a lower substrate of the display panel, or a thin film encapsulation layer), or other insulating layers or various types of functional layer (for example, an optical layer or a protective layer).

In addition, in FIG. 1, the sensor unit 120 is disposed on a front surface (for example, an upper surface on which an image is displayed) of the display unit 110, but a position of the sensor unit 120 is not limited thereto. For example, in an embodiment of the present invention, the sensor unit 120 may be disposed on a back surface or both surfaces of the display unit 110. In an embodiment of the present invention, the sensor unit 120 may be disposed on at least one edge area of the display unit 110.

The display unit 110 may include a display substrate 111 and a plurality of pixels PX formed on the display substrate 111. The pixels PX may be disposed in a display area DA of the display substrate 111.

The display substrate 111 may include the display area DA where an image is displayed and a non-display area NDA that is formed outside the display area DA. According to an embodiment of the present invention, the display area DA may be disposed in a center area of the display unit 110, and the non-display area NDA may be disposed in an edge area of the display unit 110 to at least partially surround the display area DA.

The display substrate 111 may be, for example, a rigid substrate or a flexible substrate, and a material or a physical property thereof is not particularly limited. For example, the display substrate 111 may be a rigid substrate including organic or tempered glass, or a flexible substrate including a thin film of a plastic or metal material.

Scan line SL, data lines DL, and the pixels PX connected to the scan lines SL and the data lines DL are disposed in the display area DA. The pixels PX are selected by a scan signal of a turn-on level supplied from the scan lines SL, and the pixels PX may receive a data signal from the data lines DL. The pixels PX may emit light of a luminance corresponding to the received data signal. Therefore, an image corresponding to the data signal is displayed in the display area DA. In the disclosure, a structure, a driving method, and the like of the pixels PX are not particularly limited. For example, each of the pixels PX may be implemented with a pixel employing various currently known structures and driving methods.

In the non-display area NDA, various lines and/or a built-in circuit unit connected to the pixels PX of the display area DA may be disposed. For example, a plurality of lines for supplying various power and control signals to the display area DA may be disposed in the non-display area NDA, and a scan driver or the like may be disposed in the non-display area NDA.

In the disclosure, a type of the display unit 110 is not particularly limited to a specific type. For example, the display unit 110 may be implemented as a self-emission type display panel such as an organic light emitting display panel. However, when the display unit 110 is implemented as a self-emission type, each of the pixels PX is not limited to a case where only an organic light emitting element is included. For example, the light emitting element of each of the pixels PX may be configured of an organic light emitting diode, an inorganic light emitting diode, a quantum dot/well light emitting diode, or the like. A plurality of light emitting elements may be provided in each of the pixels PX. At this time, the plurality of light emitting elements may be connected in series, parallel, series-parallel, or the like. In addition, the display unit 110 may be implemented as a non-emission type display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors formed on the sensor substrate 121. The sensors SC may be disposed in a sensing area SA on the sensor substrate 121.

The sensor substrate 121 may include the sensing area SA in which a touch input or the like may be sensed, and a peripheral area NSA outside the sensing area SA. According to an embodiment of the present invention, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when the touch input or the like is provided on the display area DA, the touch input may be detected through the sensor unit 120.

The sensor substrate 121 may be, for example, a rigid or flexible substrate, and may include at least one insulating layer. In addition, the sensor substrate 121 may be, for example, a transparent or translucent light-transmitting substrate, but the present invention is not limited thereto. For example, in the disclosure, a material and a physical property of the sensor substrate 121 are not particularly limited a certain material or physical property. For example, the sensor substrate 121 may be a rigid substrate including glass or tempered glass, or a flexible substrate including a thin film of a plastic or metal material. In addition, according to an embodiment of the present invention, at least one substrate (for example, the display substrate 111, an encapsulation substrate, and/or a thin film encapsulation layer) configuring the display unit 110, an insulating layer, a functional layer, or the like of at least one layer disposed in an inside and/or on an outer surface of the display unit 110 may be used as the sensor substrate 121.

The sensing area SA is set as an area capable of responding to the touch input (for example, an active area of a sensor). To this end, the sensors SC for sensing the touch input or the like may be disposed in the sensing area SA. According to an embodiment of the present invention, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction crossing the first direction DR1. In an embodiment of the present invention, an extension direction and an arrangement direction of the first sensors TX may follow a conventional configuration. Each of the first sensors TX may have a form in which first cells of a relatively large area and first bridges of a relatively narrow area may be connected to each other. In addition, in FIG. 1, each of the first cells is shown in a diamond shape, but each of the first cells may be configured in various shapes such as a circle, a quadrangle, a triangle, and a mesh form. For example, the first bridges may be integrally formed with the first cells and may be formed on the same layer as the first cells. In an embodiment of the present invention, the first bridges may be formed on a layer different from that of the first cells and may electrically connect adjacent first cells to each other.

For example, each of the second sensors RX may extend in the second direction DR2. The second sensors RX may be arranged in the first direction DR1. In an embodiment of the present invention, an extension direction and an arrangement direction of the second sensors RX may follow a conventional configuration. Each of the second sensors RX may have a form in which second cells of a relatively large area and second bridges of a relatively narrow area are connected to each other. In FIG. 1, each of the second cells is shown in a diamond shape, but may be configured in various shapes such as a circle, a quadrangle, a triangle, and a mesh form. For example, the second bridges may be integrally formed with the second cells and may be formed on the same layer as the second cells. In an embodiment of the present invention, the second bridges may be formed in a layer different from that of the second cells and may electrically connect adjacent second cells to each other.

According to an embodiment of the present invention, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In addition, the first sensors TX and the second sensors RX may be configured in a mesh form. In addition, the first sensors TX and the second sensors RX may include at least one of various transparent conductive materials including, for example, silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide (SnO2), carbon nano tube, graphene, and the like. In addition, the first sensors TX and the second sensors RX may have conductivity by including at least one of various conductive materials. In addition, each of the first sensors TX and the second sensors RX may be formed of a single layer or multiple layers, and a cross-sectional structure thereof is not particularly limited thereto.

In addition, sensor lines, which are for electrically connecting the first and second sensors TX and RX to the sensor driver 220 and the like, may be disposed in the peripheral area NSA of the sensor unit 120.

The driving circuit 20 may include the display driver 210 for driving the display unit 110 and the sensor driver 220 for driving the sensor unit 120. In an embodiment of the present invention, the display driver 210 and the sensor driver 220 may include integrated chips (ICs) separated from each other. In an embodiment of the present invention, at least a portion of the display driver 210 and the sensor driver 220 may be integrated together in one IC.

The display driver 210 is electrically connected to the display unit 110 to drive the pixels PX. For example, the display driver 210 may include the data driver and a timing controller, and the scan driver may be separately mounted in the non-display area NDA of the display unit 110. In an embodiment of the present inventive concept, the display driver 210 may include all or at least a portion of the data driver, the timing controller, and the scan driver.

The display driver 210 may receive image data and control signals from the application processor. A first oscillator may be provided inside the display driver 210 to generate a first clock signal. The display driver 210 may determine the driving frequency (or the frame rate) using synchronization signals included in the control signals, and may generate various signals and the like including a vertical synchronization signal Vsync and a horizontal synchronization signal Hsync by dividing the first clock signal.

For example, the control signal supplied from the application processor to the display driver 210 may include an external vertical synchronization signal, an external horizontal synchronization signal, and the like. The display driver 210 may generate the vertical synchronization signal Vsync and the horizontal synchronization signal to be used inside the display device 1 by using the external vertical synchronization signal and the external horizontal synchronization signal. The disclosure controls the vertical synchronization signal Vsync, and other signals are not separately shown or described.

The display driver 210 may change a polarity of the vertical synchronization signal Vsync when the driving frequency of the display device 1 is changed. For example, when the driving frequency is changed, the display driver 210 may change a pulse of the vertical synchronization signal Vsync from a logic high level (for example, a predetermined high voltage) to a logic low level (for example, a predetermined low voltage). For example, when the driving frequency is changed, the display driver 210 may change the pulse of the vertical synchronization signal Vsync from a logic low level to a logic high level.

When the polarity of the vertical synchronization signal Vsync is changed, the display driver 210 may control a width of a first pulse of the vertical synchronization signal of which a polarity is changed. Here, the width of the first pulse may be set in response to the driving frequency, that is, the frame rate. The vertical synchronization signal Vsync generated in the display driver 210 may be supplied to the sensor driver 220.

The sensor driver 220 is electrically connected to the sensor unit 120 to drive the sensor unit 120. The sensor driver 220 may include a sensor transmitter and a sensor receiver. According to an embodiment of the present invention, the sensor transmitter and the sensor receiver may be integrated into one IC, but is not limited thereto.

The sensor driver 220 may supply control signals to the sensor transmitter and the sensor receiver so that the sensor unit 120 may sense a touch. The sensor transmitter may supply a touch signal to the first sensors TX (and/or the second sensors RX), and the sensor receiver may receive a sensing signal corresponding to the touch signal from the second sensors RX (and/or the first sensors TX).

The sensor driver 220 may receive the vertical synchronization signal Vsync from the display driver 210 and determine the driving frequency using the vertical synchronization signal Vsync. The sensor driver 220 may determine that the driving frequency is changed when the polarity of the vertical synchronization signal Vsync is inverted, and determine the driving frequency by using the width of the first pulse of which the polarity is changed. In this case, the sensor driver 220 may determine the driving frequency of the display device 1 (or the display driver 210) in real time.

For example, even though the driving frequency of the display device 1 is changed, the display driver 210 and the sensor driver 220 may generate various signals in response to the same driving frequency, thereby increasing display quality of the display device 1. A detailed description related to this is described later.

A second oscillator for generating a second clock signal may be provided inside the sensor driver 220. The sensor driver 220 may determine the driving frequency by counting the width of the first pulse of the vertical synchronization signal Vsync of which the polarity is changed using the second clock signal. The sensor driver 220 may generate various control signals by dividing the second clock signal supplied from the second oscillator. For example, the sensor driver 220 may generate the touch signal by dividing the second clock signal. A frequency of the touch signal may be generated to be synchronized or asynchronous with the horizontal synchronization signal Hsync and/or the vertical synchronization signal Vsync.

Figure 2:
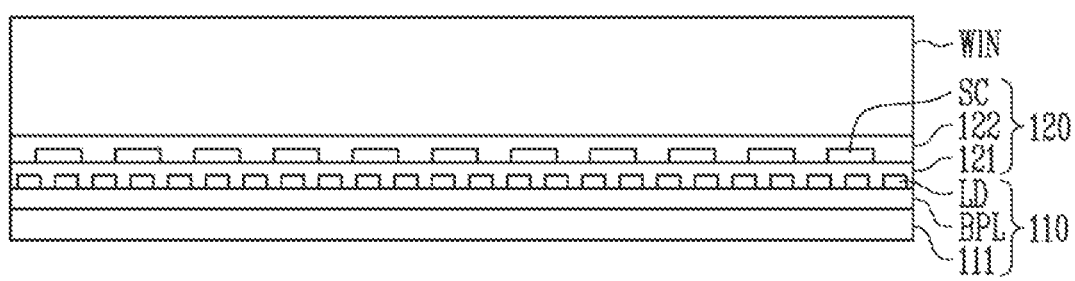
FIG. 2 is a cross-sectional view illustrating an embodiment of the display device of FIG. 1.

FIG. 2 is a cross-sectional view illustrating the display device of FIG. 1 according to an embodiment of the present invention.

Referring to FIGS. 1 and 2, the sensor unit 120 may be stacked on the display unit 110, and a window WIN may be stacked on the sensor unit 120.

The display unit 110 may include a display substrate 111, a circuit element layer BPL formed on the display substrate 111, and light emitting elements LD that are formed on the circuit element layer BPL. The circuit element layer BPL may include pixel circuits (for example, a transistor and a capacitor), scan lines SL, and data lines DL for driving the light emitting elements LD of the pixels PX.

The sensor unit 120 may include a sensor substrate 121, sensors SC formed on the sensor substrate 121, and a protective layer 122 covering the sensors SC and disposed on the sensor substrate 121. In the embodiment of FIG. 2, the sensor substrate 121 is shown as an encapsulation layer covering the pixels PX. In an embodiment of the present invention, the sensor substrate 121 may exist separately from the encapsulation layer covering the pixels PX.

The window WIN may be a protective member disposed on the uppermost end of a module of the display device 1 and may be a substantially transparent light-transmitting substrate. For example, the window WIN may have a single layer structure or a multilayer structure selected from an organic substrate, a plastic film, and a plastic substrate. For example, the window WIN may include a rigid or flexible substrate, and a material of the window WIN is not particularly limited thereto.

The display device 1 may further include a polarizing plate (or another type of anti-reflection layer) for preventing reflection of external light between the window WIN and the sensor unit 120.

Figure 3:
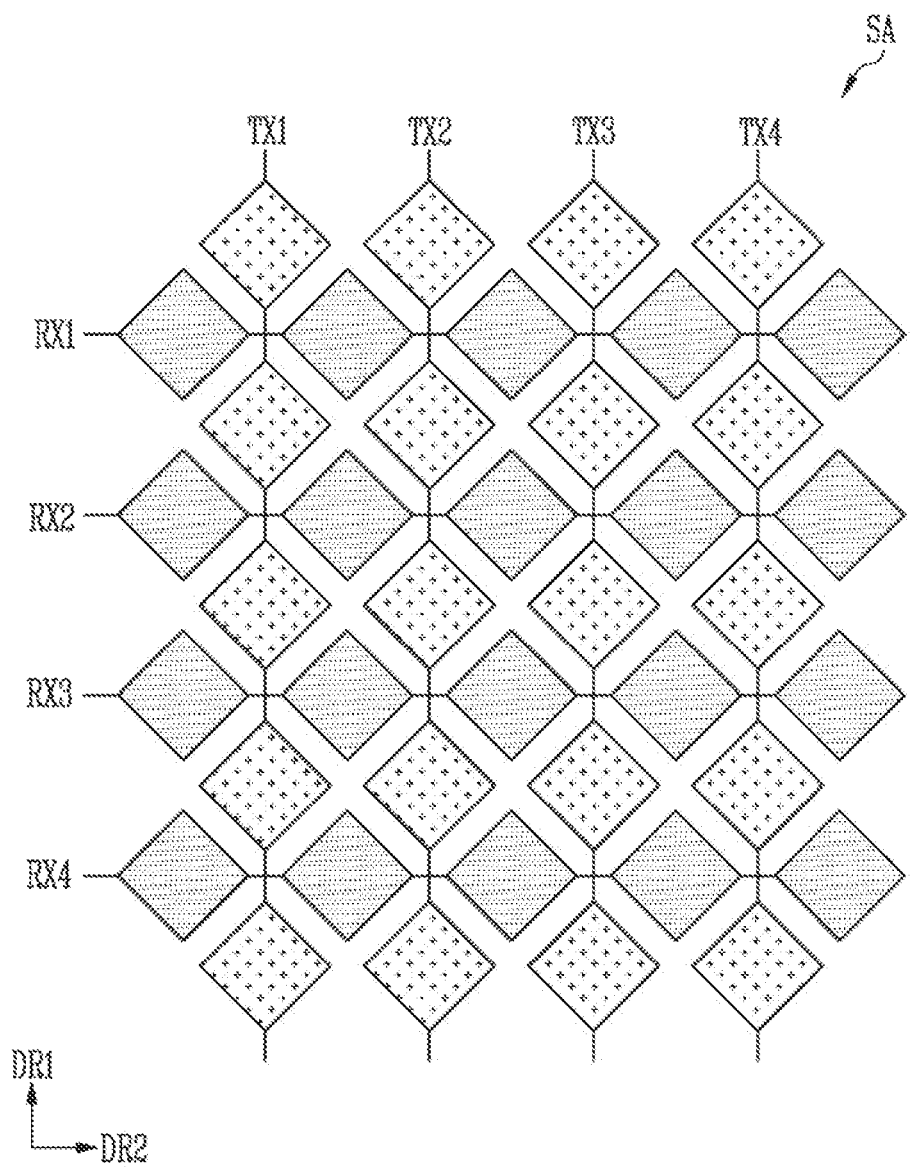
FIG. 3 is a diagram illustrating sensors included in the display device of FIG. 2 according to an embodiment of the present invention.

FIG. 3 is a diagram illustrating sensors included in the display device of FIG. 2 according to an embodiment of the present invention.

Referring to FIGS. 1 to 3, first sensors TX1, TX2, TX3, and TX4 and second sensors RX1, RX2, RX3, and RX4, which are positioned in the sensing area SA, are shown. the four first sensors TX1 to TX4 are disposed and the four second sensors RX1 to RX4 are disposed in the sensing area SA. Actually, y (for example, y is a natural number) to p (for example, p is a natural number greater than y) first sensors TX and second sensors RX may be disposed in the display device 1.

Since a description of the first sensors TX1 to TX4 and the second sensors RX1 to RX4 is the same as that of the first sensors TX and the second sensors RX of FIG. 1, an overlapping description is omitted or briefly discussed.

Figure 4:
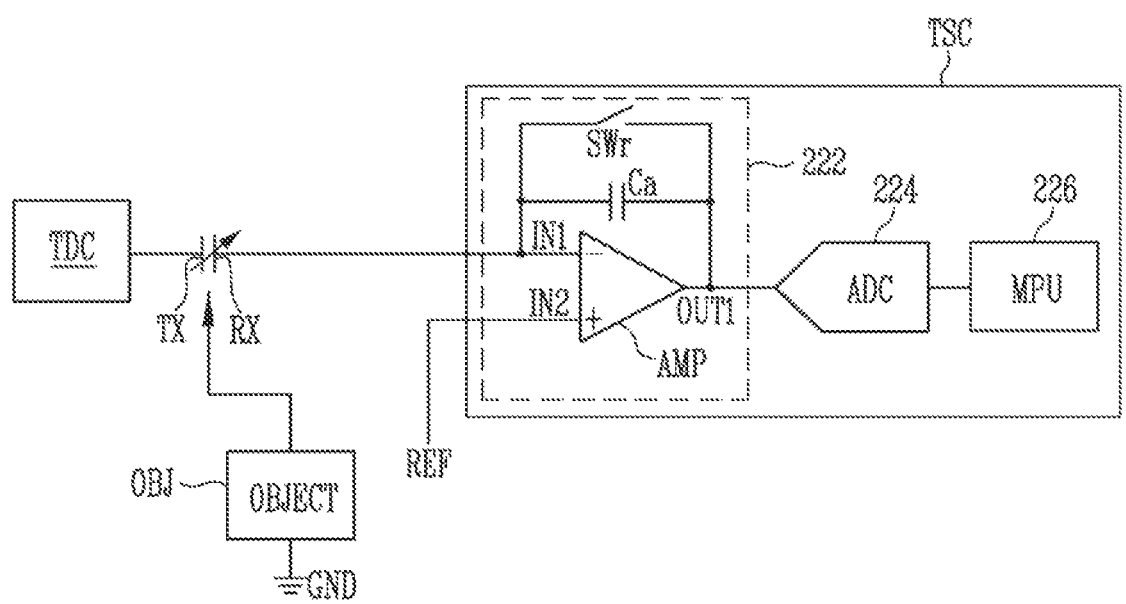
FIGS. 4 and 5 are diagrams illustrating a mutual sensing period.
Figure 5:
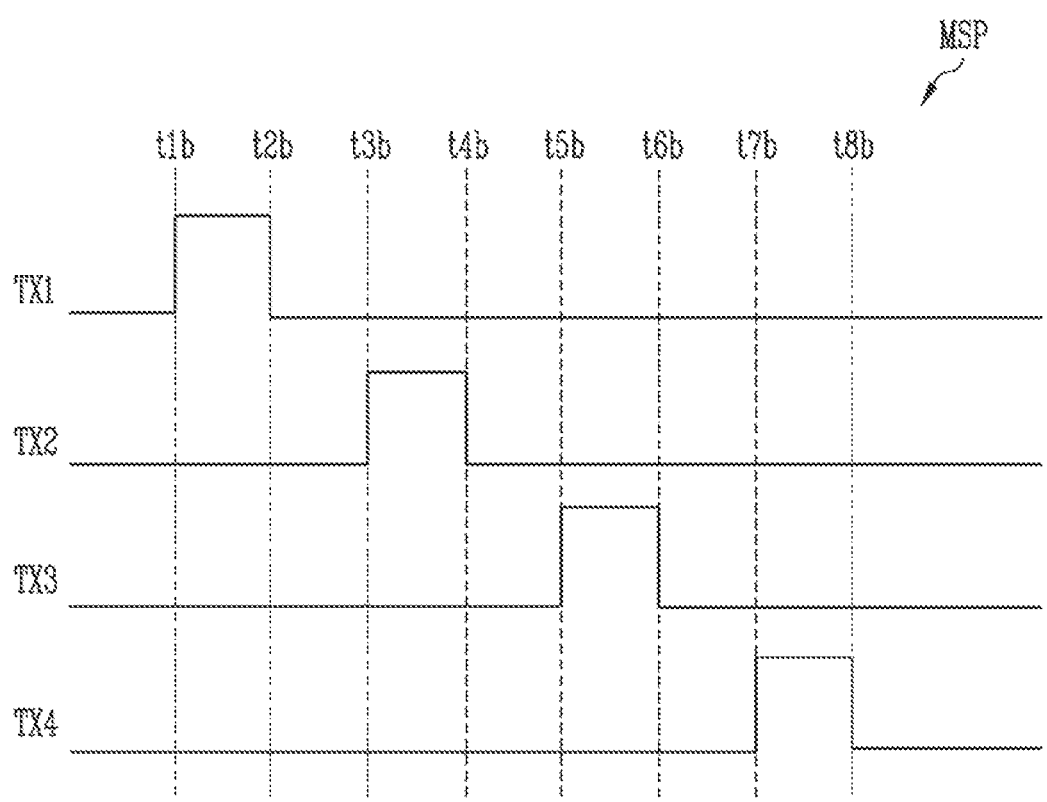

FIGS. 4 and 5 are diagrams illustrating a mutual sensing period.

Referring to FIGS. 1 to 5, the mutual sensing period MSP may be a period in which the sensor unit 120 and the sensor driver 220 are driven in a mutual capacitance mode. In FIG. 4, driving of the sensor unit 120 and the sensor driver 220 is shown based on any one sensor channel 222.

The sensor driver 220 may include a sensor receiver TSC and a sensor transmitter TDC. In the mutual sensing period MSP, the sensor transmitter TDC may be connected to the first sensors TX, and the sensor receiver TSC may be connected to the second sensors RX.

The sensor receiver TSC may include an operational amplifier AMP, an analog-to-digital converter 224, and a processor 226. As an example, each sensor channel 222 may be implemented as an analog front end (AFE) including at least one operational amplifier AMP. The analog-to-digital converter 224 and the processor 226 may be provided for each sensor channel 222 and may be shared by a plurality of sensor channels 222.

A first input terminal IN1 of the operational amplifier AMP may be connected to a corresponding second sensor RX, and a second input terminal IN2 of the operational amplifier AMP may be connected to a reference signal REF. For example, the first input terminal IN1 may be an inverting terminal, and the second input terminal IN2 may be a non-inverting terminal. The reference signal REF may be a ground voltage or a voltage of a specific magnitude. According to an embodiment of the present invention, the reference signal REF may be a signal provided through a second sensor different from the corresponding second sensor.

The analog-to-digital converter 224 may be connected to an output terminal OUT1 of the operational amplifier AMP. The analog-to-digital converter 224 may convert an output of the operational amplifier AMP into a sensing value of a digital format and may output the sensing value. A capacitor Ca and a switch SWr may be connected in parallel between the first input terminal IN1 and the output terminal OUT1.

Referring to FIG. 5, during the mutual sensing period MSP, the sensor driver 220 (for example, the sensor transmitter TDC) may sequentially supply first touch signals (or signals for sensing) to the first sensors TX1 to TX4. For example, the first touch signals may be supplied to the first sensor TX1 twice (t1$b$ and t2$b$), and the first touch signals may be supplied to the first sensor TX2 twice (t3$b$ and t4$b$). For example, the first touch signals may be supplied to the first sensor TX3 twice (t5$b$ and t6$b$), and the first touch signals may be supplied to the first sensor TX4 twice (t7$b$ and t8$b$). The number of times the first touch signals are supplied to each of the first sensors TX1 to TX4 may be more than twice according to an embodiment of the present invention.

Each of the first touch signals may correspond to a rising transition and/or a falling transition. For example, the first touch signal at a time point t1$b$ may correspond to the rising transition. For example, at the time point t1$b$, the first touch signal may rise from a low level to a high level. The first touch signal at a time point t2$b$ may correspond to the falling transition. For example, at the time point t2$b$, the first touch signal may fall from a high level to a low level.

The sensor receiver TSC may include a plurality of sensor channels 222 connected to a plurality of second sensors RX. Each of the sensor channels 222 may receive first sensing signals (or first sampling signals) corresponding to the first touch signals provided from a corresponding second sensor. For example, in response to the first touch signal applied to the first sensor TX1 at the time t1$b$, the sensor channels 222 connected to the second sensors RX1 to RX4 may independently receive the first sensing signals. In addition, in response to the first touch signal applied to the first sensor TX1 at the time t2$b$, the sensor channels 222 connected to the second sensors RX1 to RX4 may independently receive the first sensing signals.

Mutual capacitances between the first sensors TX1 to TX4 and the second sensors RX1 to RX4 may be different from each other according to a position of an object OBJ, such as a user's finger, on the sensing area SA, and thus, the first sensing signals received by the sensor channels 222 may be different from each other. A touch position of the object OBJ may be detected by using a difference between the first sensing signals.

The sensor channel 222 may generate an output signal corresponding to a voltage difference between the first input terminal IN1 and the second input terminal IN2. For example, the sensor channel 222 may amplify the difference in voltage between the first input terminal IN1 and the second input terminal IN2 in a degree corresponding to a predetermined gain, and output the difference in voltage.

According to an embodiment of the present invention, the sensor channel 222 may be implemented as an integrator. In this case, the capacitor Ca and the switch SWr may be connected in parallel between the first input terminal IN1 and the output terminal OUT of the operational amplifier AMP. For example, by turning on the switch SWr before receiving the first sampling signal, charges of the capacitor Ca may be initialized. At a time of receiving the first sampling signal, the switch SWr may be in a turn-off state.

The analog-to-digital converter 224 converts an analog signal input from each of the sensor channels 222 into a digital signal. The processor 226 may analyze the digital signal to detect a user's input. The processor 226 may be included in the application processor.

Figure 6:
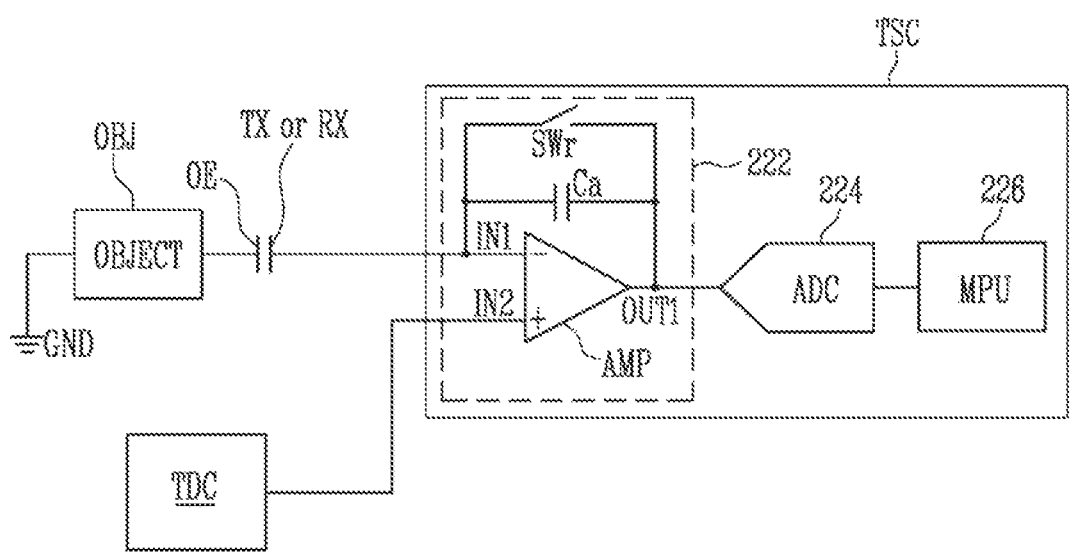
FIGS. 6, 7 and 8 are diagrams illustrating a first self-sensing period and a second self-sensing period.
Figure 7:
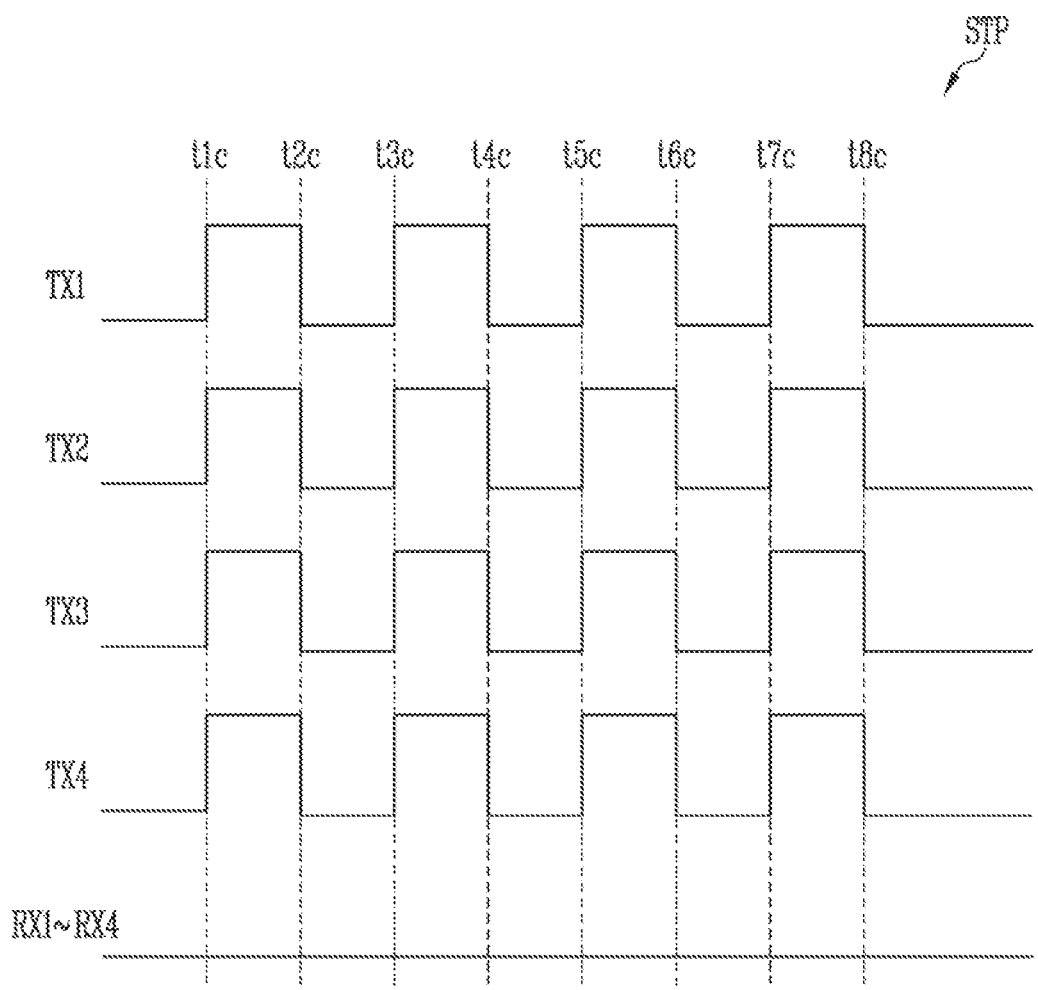
Figure 8:
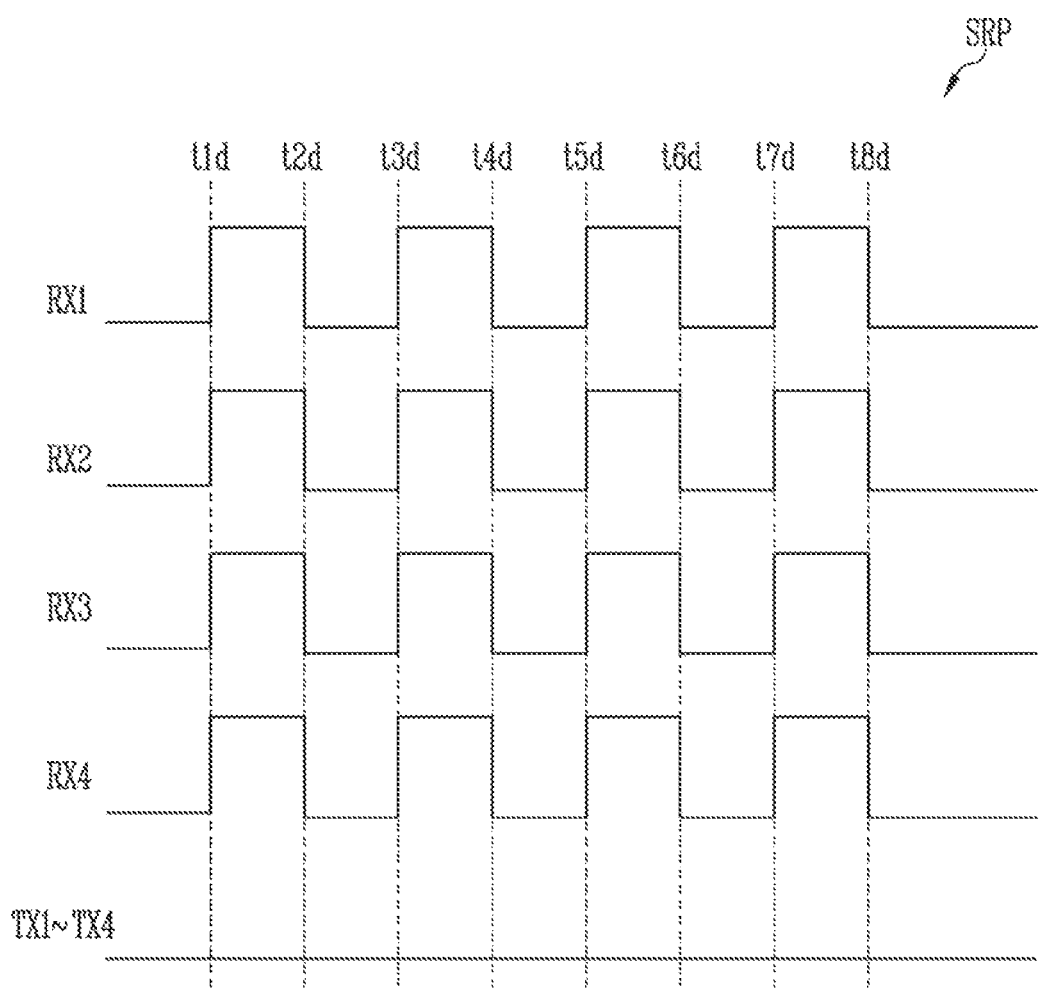

FIGS. 6 to 8 are diagrams illustrating a first self-sensing period and a second self-sensing period. In FIG. 6, a configuration of the sensor unit 120 and the sensor driver 220 is shown based on any one sensor channel 222. An internal configuration of the sensor receiver TSC and the sensor transmitter TDC may be substantially the same as that of FIG. 4. An overlapping description thereof is omitted, and hereinafter, a difference is mainly described.

Referring to FIGS. 6 to 8, the first self-sensing period STP may be a period in which the sensor unit 120 and the sensor driver 220 are driven in a self-capacitance mode. In the first self-sensing period STP, the sensor transmitter TDC is connected to the second input terminal IN2 of each sensor channel 222, and a corresponding first sensor may be connected to the first input terminal IN1 of each sensor channel 222. In an embodiment of the present invention, the sensor transmitter TDC may be connected to the first input terminal IN1. In addition, the reference signal REF (refer to FIG. 4) may be applied to the second input terminal IN2.

Referring to FIG. 7, during the first self-sensing period STP, the sensor transmitter TDC may supply a second touch signal to the second input terminal IN2 of each sensor channel 222. In addition, the second touch signal may be supplied to a first sensor connected to the first input terminal IN1 according to a characteristic of the operational amplifier AMP. In an embodiment of the present invention, the sensor driver 220 may simultaneously the supply second touch signals to the first sensors TX1 to TX4 during the first self-sensing period STP. For example, referring to FIG. 7, the second touch signals may be simultaneously supplied to the first sensors TX1 to TX4 at each of time points t1$c$, t2$c$, t3$c$, t4$c$, t5$c$, t6$c$, t7$c$, and t8$c$. In addition, the second sensors RX1 to RX4 may receive a separate reference signal (for example, the ground voltage) or may be in a floating state. Each of the second touch signals may correspond to a rising transition and/or a falling transition.

The first sensors TX1 to TX4 may have a self-capacitance. In addition, when the object OBJ, such as the user's finger, approaches the first sensors TX1 to TX4, the self-capacitance of the first sensors TX1 to TX4 may change according to a capacitance formed with an object surface OB. The second touch signal in which the self-capacitance is reflected may be referred to as a second sensing signal (or a second sampling signal). A touch position of the object OBJ in the second direction DR2 may be detected using a difference between the second sensing signals of the first sensors TX1 to TX4 (refer to FIG. 3).

Referring to FIG. 8, the second self-sensing period SRP may be a period in which the sensor unit 120 and the sensor driver 220 are driven in the self-capacitance mode. In the second self-sensing period SRP, the sensor transmitter TDC may be connected to the second input terminal IN2 of each sensor channel 222 and a corresponding second sensor may be connected to the first input terminal IN1 of each sensor channel 222.

For example, during the second self-sensing period SRP, the sensor transmitter TDC may supply a third touch signal to the second input terminal IN2 of each sensor channel 222. In addition, the third touch signal may be supplied to a second sensor connected to the first input terminal IN1 according to the characteristic of the operational amplifier AMP. In an embodiment of the present invention, the sensor driver 220 may simultaneously supply the third touch signals to the second sensors RX1 to RX4 during the second self-sensing period SRP. For example, referring to FIG. 8, the third touch signals may be simultaneously supplied to the second sensors RX1 to RX4 at each of time points t1$d$, t2$d$, t3$d$, t4$d$, t5$d$, t6$d$, t7$d$, and t8$d$. In addition, the first sensors TX1 to TX4 may receive a separate reference signal (for example, the ground voltage) or may be in a floating state. Each of the third touch signals may correspond to a rising transition or a falling transition.

The second sensors RX1 to RX4 may have a self-capacitance. In addition, when the object OBJ, such as the user's finger, approaches the second sensors RX1 to RX4, the self-capacitance of the second sensors RX1 to RX4 may change according to the capacitance formed with the object surface OB. The third touch signal in which the self-capacitance is reflected may be referred to as a third sensing signal (or a third sampling signal). The touch position of the object OBJ in the first direction DR1 may be detected by using a difference between the third sensing signals of the second sensors RX1 to RX4 (refer to FIG. 3).

As described above, the sensor driver 220 may be driven according to at least one of the mutual sensing period MSP, the first self-sensing period STP, and/or a second self-sensing period SRP with respect to the sensing area SA of the sensor unit 120 (refer to FIGS. 5, 7, and 8).

Figure 9:
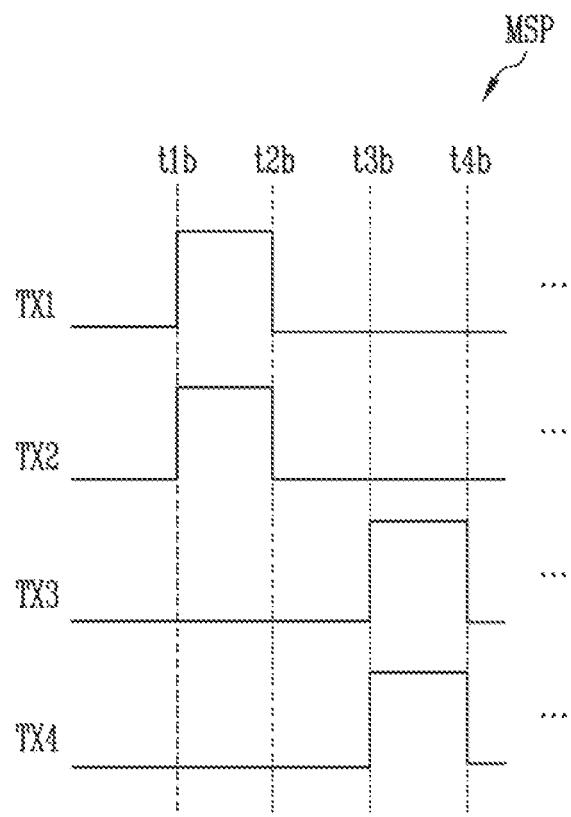
FIG. 9 is diagram illustrating a sensing method according to an embodiment of the present invention.

FIG. 9 is diagrams illustrating a sensing method according to an embodiment of the present invention.

Referring to FIGS. 1 and 4 to 9, the sensor driver 220 may transmit a driving signal to the sensing area SA of the sensor unit 120 in a unit of p sensors.

For example, as shown in FIG. 9, the sensor driver 220 may transmit the driving signal in a unit of two first sensors in the mutual sensing period MSP. In this case, p may be 2. For example, the driving signals may be simultaneously supplied to two of the first sensors TX1 to TX4, and then the driving signals may be simultaneously supplied to next two first sensors.

In an actual display device including tens to hundreds of first sensors TX, p may be approximately 4. For example, the driving signals may be simultaneously supplied to the four first sensors TX1 to TX4, and then the driving signals may be simultaneously supplied to next four first sensors.

Figure 10A:
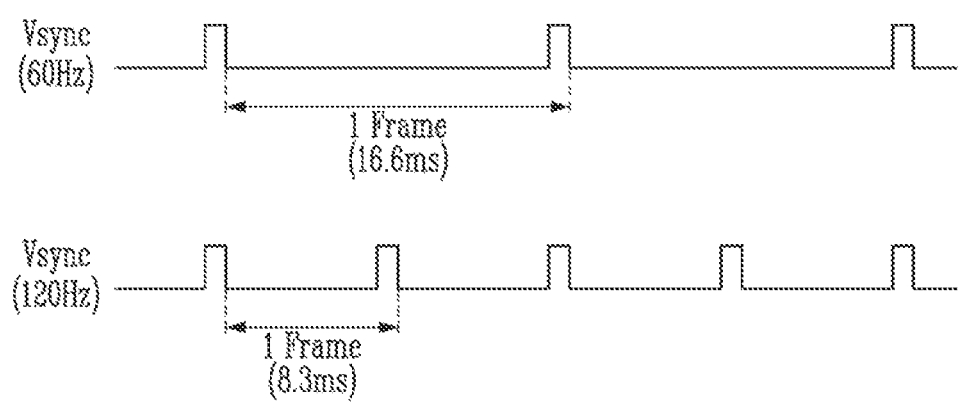
FIG. 10A is a diagram illustrating a vertical synchronization signal corresponding to a comparative example.
Figure 10B:
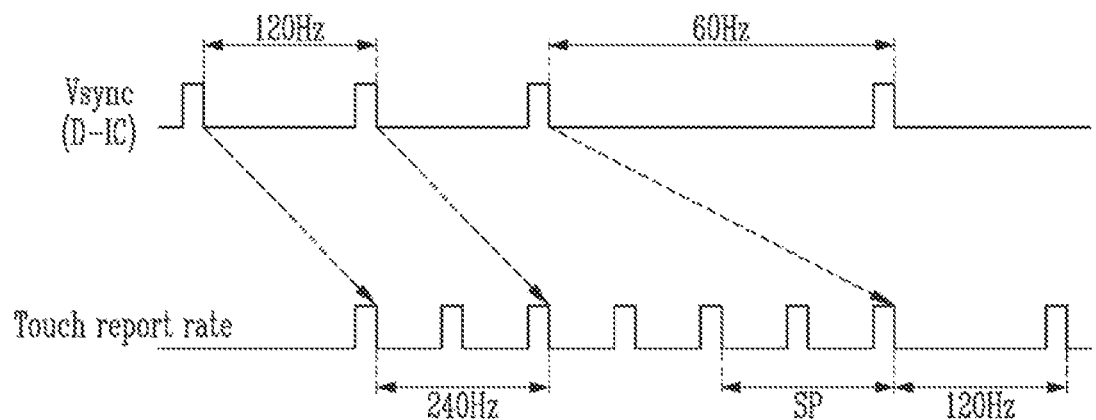
FIG. 10B is a diagram illustrating a touch report rate corresponding to the vertical synchronization signal of FIG. 10A.

FIG. 10A is a diagram illustrating a vertical synchronization signal corresponding to a comparative example. FIG. 10B is a diagram illustrating a touch report rate corresponding to the vertical synchronization signal of FIG. 10A. In FIG. 10B, it may be assumed that the touch report rate has a frequency that is twice that of the driving frequency.

Referring to FIG. 10A, a period of the vertical synchronization signal Vsync may be set differently in response to the driving frequency. Here, one period of the vertical synchronization signal Vsync may correspond to one frame period. For example, when the driving frequency is set to 60 Hz, the period (that is, one frame) of the vertical synchronization signal Vsync may be set to approximately 16.6 ms.

For example, when the driving frequency is set to 120 Hz, the period (that is, one frame) of the vertical synchronization signal Vsync may be set to approximately 8.3 ms. The vertical synchronization signal Vsync is supplied in a pulse form, and a pulse may have the same polarity (for example, a logic high level).

Referring to FIG. 10B, when the vertical synchronization signal Vsync as shown in FIG. 10A is generated in the display driver 210, the sensor driver 220 may determine the driving frequency by counting one period of the vertical synchronization signal Vsync. In this case, at least one frame period may be delayed and the driving frequency may be determined in the sensor driver 220 in comparison with an actual driving frequency of the display driver 210.

For example, the touch report rate may have a frequency that is twice that of the driving frequency. The touch report rate is a speed at which a touch input coordinate is transmitted to the application processor or the like. As the touch report rate increases, an update speed of the touch input coordinate may increase, and thus touch sensitivity may be increased.

When the driving frequency determined in the sensor driver 220 is delayed during one frame period, a frequency of the touch report rate may also be delayed and changed during one frame period. For example, when a frequency of the vertical synchronization signal Vsync generated in the display driver 210 is 120 Hz, the sensor driver 220 may set the touch report rate to 240 Hz after one frame is delayed.

For example, when the frequency of the vertical synchronization signal Vsync generated in the display driver 210 is 60 Hz, the sensor driver 220 may set the touch report rate to 120 Hz after one frame is delayed.

In addition, since the driving frequency is determined after one frame is delayed in the sensor driver 220 in comparison with the display driver 210, when the driving frequency of the display driver 210 is changed from 120 Hz to 60 Hz, the touch report rate may be set to an undesirable frequency during a partial period SP.

When the driving frequency of the display device 1 is successively changed, the touch report rate generated in the sensor driver 220 may be different from a desired frequency during a plurality of frame periods, and thus, a touch input might not be stably sensed.

Additionally, the sensor driver 220 may generate various signals (for example, a touch signal) in response to the vertical synchronization signal Vsync. Here, when the driving frequency determined in the sensor driver 220 is different from the driving frequency of the display driver 210, predetermined noise (for example, a horizontal line, flicker, jitter, or the like) may occur in an image.

Figure 11:
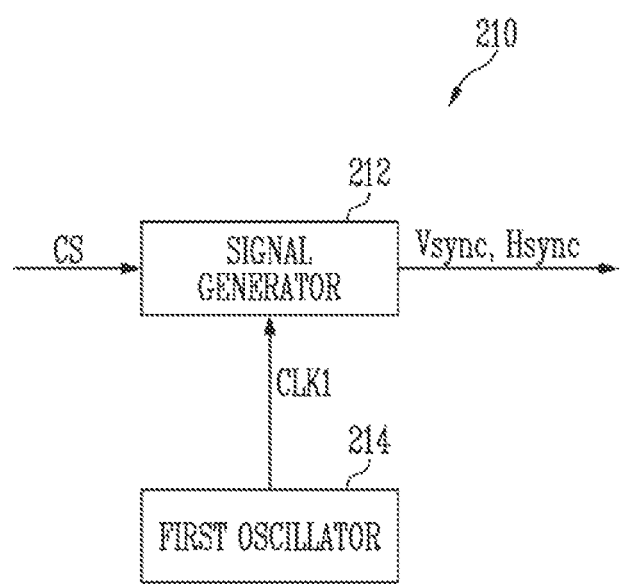
FIG. 11 is a diagram illustrating a display driver shown in FIG. 1 according to an embodiment of the present inventive concept.

FIG. 11 is a diagram illustrating the display driver shown in FIG. 1 according to an embodiment of the present invention. In FIG. 11, a configuration for a description of the disclosure is shown, according to an embodiment of the present invention.

Referring to FIG. 11, the display driver 210 according to an embodiment of the present invention may include a signal generator 212 and a first oscillator 214.

The first oscillator 214 (or a display oscillator) may generate a first clock signal CLK1 (or a display clock signal) to be used inside the display driver 210. Here, the first clock signal CLK1 may have a high frequency (for example, a frequency equal to or higher than 1 MHZ).

The signal generator 212 may receive a control signal CS from an outside (for example, the application processor, or the like). The signal generator 212 receiving the control signal CS may generate the vertical synchronization signal Vsync, the horizontal synchronization signal Hsync (and a data enable signal, and the like) and the like by dividing the first clock signal CLK1 based on the control signal CS.

As described above, the period of the vertical synchronization signal Vsync may correspond to the frame period. The frame period may refer to a period in which an image of one screen is displayed on the display unit 110.

A period of the horizontal synchronization signal Hsync may correspond to a horizontal period. The horizontal period may refer to a period in which a data signal is supplied to pixels that are positioned on one horizontal line (for example, a pixel row in which pixels connected to the same scan line are positioned).

Figure 12A:
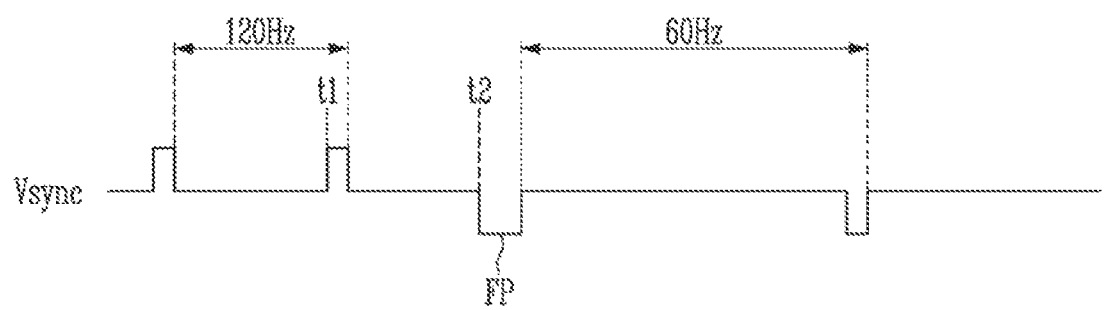
FIGS. 12A and 12B illustrate the vertical synchronization signal generated in a signal generator of FIG. 11 according to an embodiment of the present inventive concept.
Figure 12B:
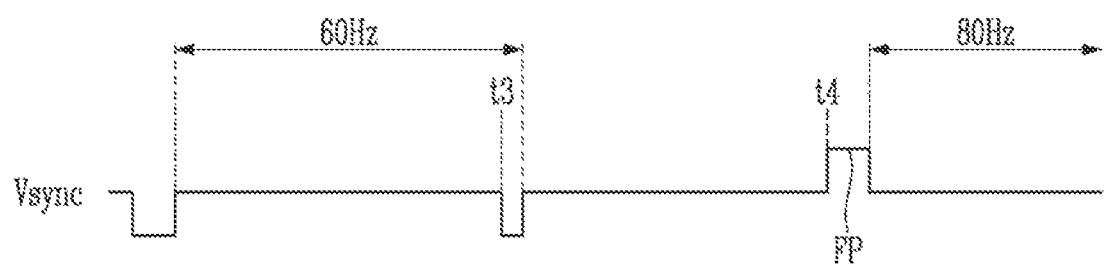

FIGS. 12A and 12B illustrate the vertical synchronization signal generated in the signal generator of FIG. 11, according to an embodiment of the present invention. FIGS. 13A to 14B are diagrams illustrating the width of the first pulse of which the polarity is inverted.

Referring to FIGS. 12A and 12B, the signal generator 212 may invert (or toggle) the polarity (that is, the polarity of the pulse) of the vertical synchronization signal Vsync when the driving frequency of the display device 1 is changed.

For example, the signal generator 212 may change the pulse polarity of the vertical synchronization signal Vsync from a logic high level (or a predetermined high voltage) to a logic low level (or a predetermined low voltage) when the driving frequency is changed from 120 Hz to 60 Hz.

For example, the signal generator 212 may change the pulse polarity of the vertical synchronization signal Vsync from a logic low level (or a predetermined low voltage) to a logic high level (or a predetermined high voltage) when the driving frequency is changed from 60 Hz to 80 Hz.

That is, in an embodiment of the present invention, the signal generator 212 may invert the pulse polarity of the vertical synchronization signal Vsync whenever the driving frequency of the display device 1 is changed, and thus, the sensor driver 220 may determine whether the driving frequency is changed by using the pulse polarity of the vertical synchronization signal Vsync.

Figure 13A:
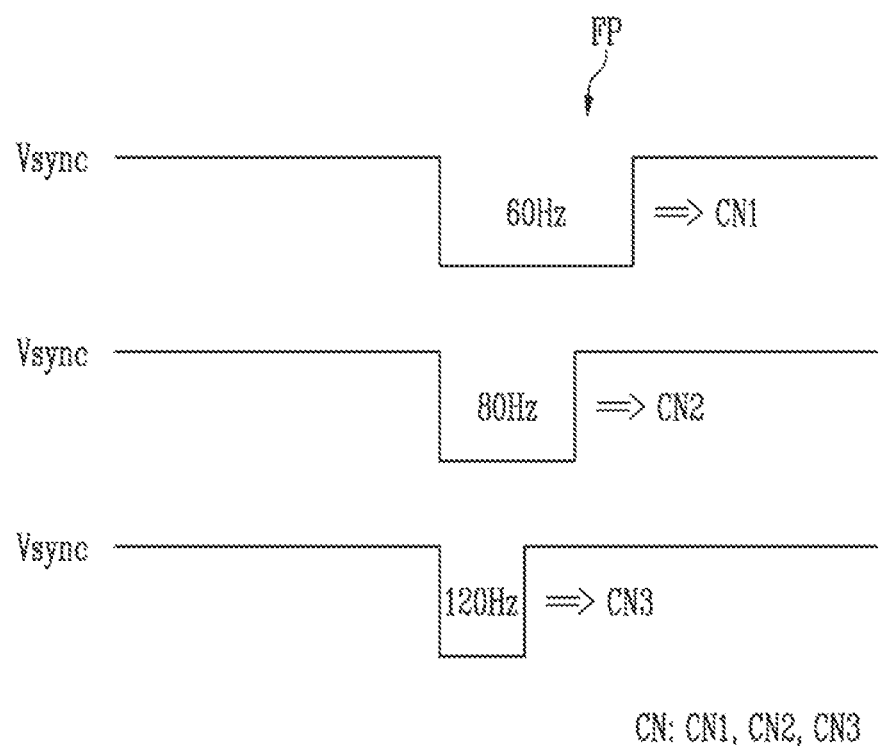
FIGS. 13A, 13B, 14A, and 14B are diagrams illustrating a width of a first pulse of which a polarity is inverted.
Figure 14A:
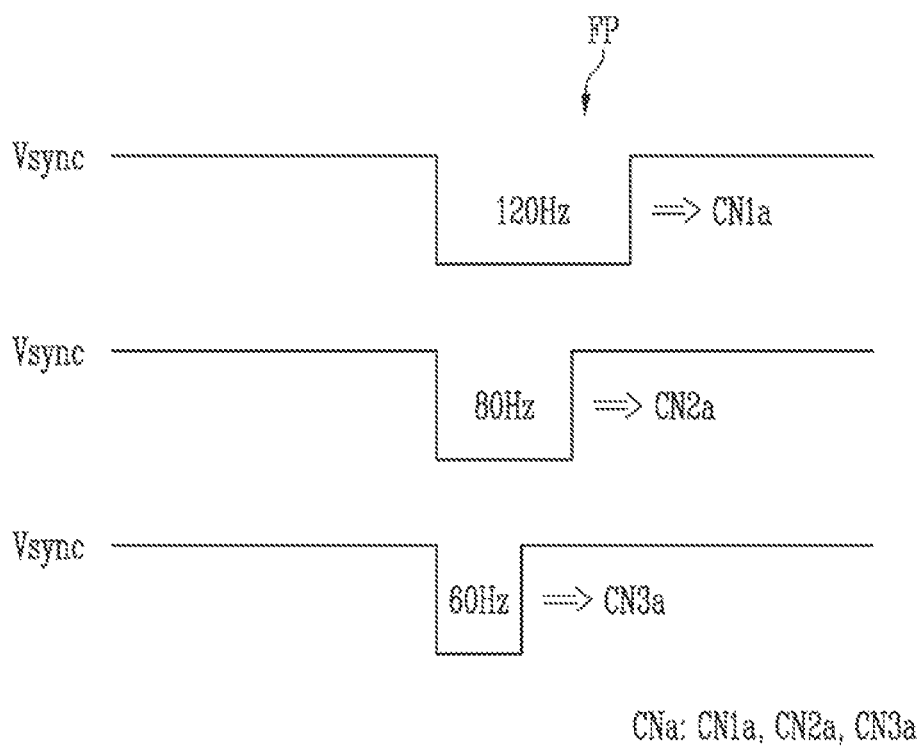
Figure 14B:
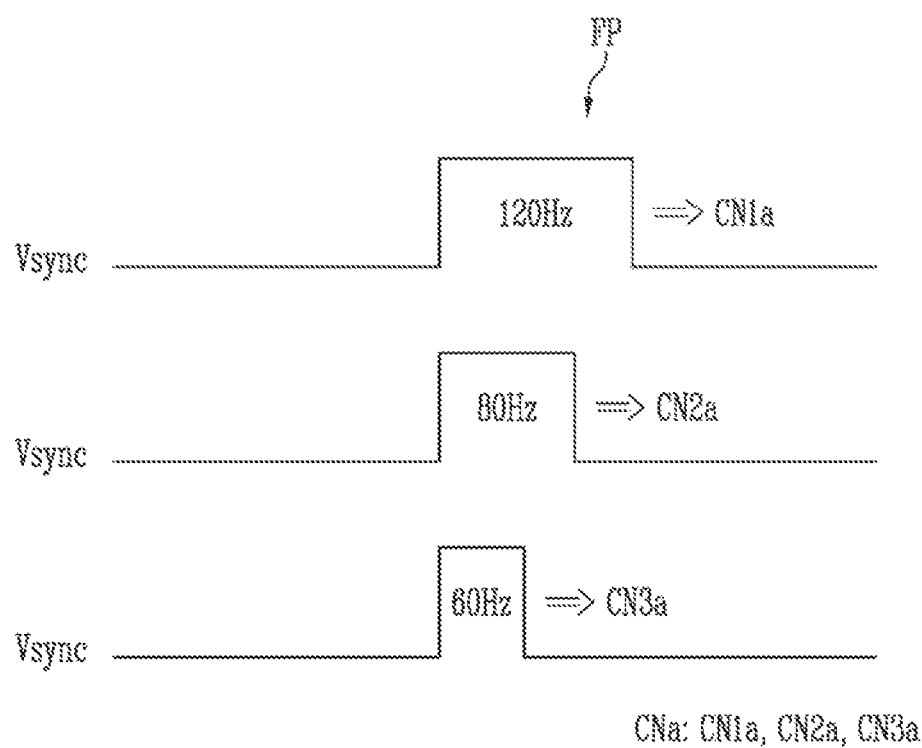

Referring to FIGS. 13A and 14B, when the pulse polarity of the vertical synchronization signal Vsync is inverted, the signal generator 212 may control the width of the first pulse FP in response to the driving frequency. In an embodiment of the present invention, when the polarity of the vertical synchronization signal Vsync is inverted, the width of the first pulse FP may be set in response to the driving frequency.

Figure 13B:
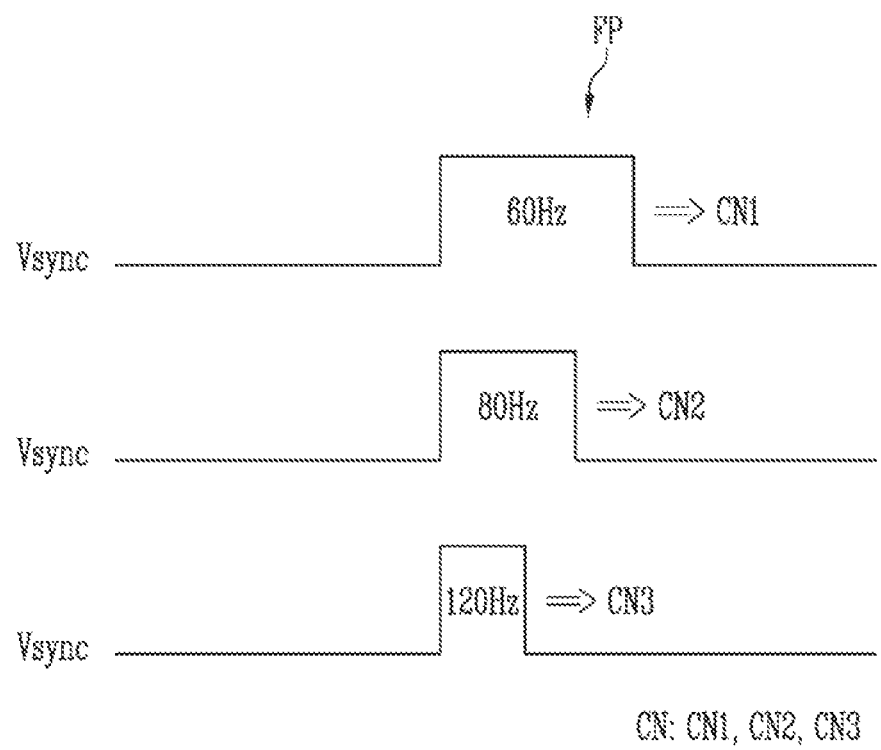

For example, the signal generator 212 may set the width of the first pulse FP to be narrower (e.g., shorter) as the driving frequency increases, as shown in FIGS. 13A and 13B. For example, when the driving frequency is 60 Hz, the width of the first pulse FP may be set to a width wider than that of a case where the driving frequency is 80 Hz. For example, when the driving frequency is 80 Hz, the width of the first pulse FP may be set to a width wider than that of a case where the driving frequency is 120 Hz. FIG. 13A may illustrate a case where the first pulse FP is a logic low level, and FIG. 13B may illustrate a case where the first pulse FP is a logic high level.

For example, the signal generator 212 may set the width of the first pulse FP to be wider (or, e.g., longer) as the driving frequency increases, as shown in FIGS. 14A and 14B. For example, when the driving frequency is 60 Hz, the width of the first pulse FP may be set to a width narrower than that of a case where the driving frequency is 80 Hz. For example, when the driving frequency is 80 Hz, the width of the first pulse FP may be set to a width narrower than that of a case where the driving frequency is 120 Hz. FIG. 14A may illustrate a case where the first pulse FP is a logic low level, and FIG. 14B may illustrate a case where the first pulse FP is a logic high level.

The sensor driver 220 may determine the driving frequency of the display driver 210 (or the driving frequency of the display device 1) using the width of the first pulse FP of the vertical synchronization signal Vsync.

Figure 15:
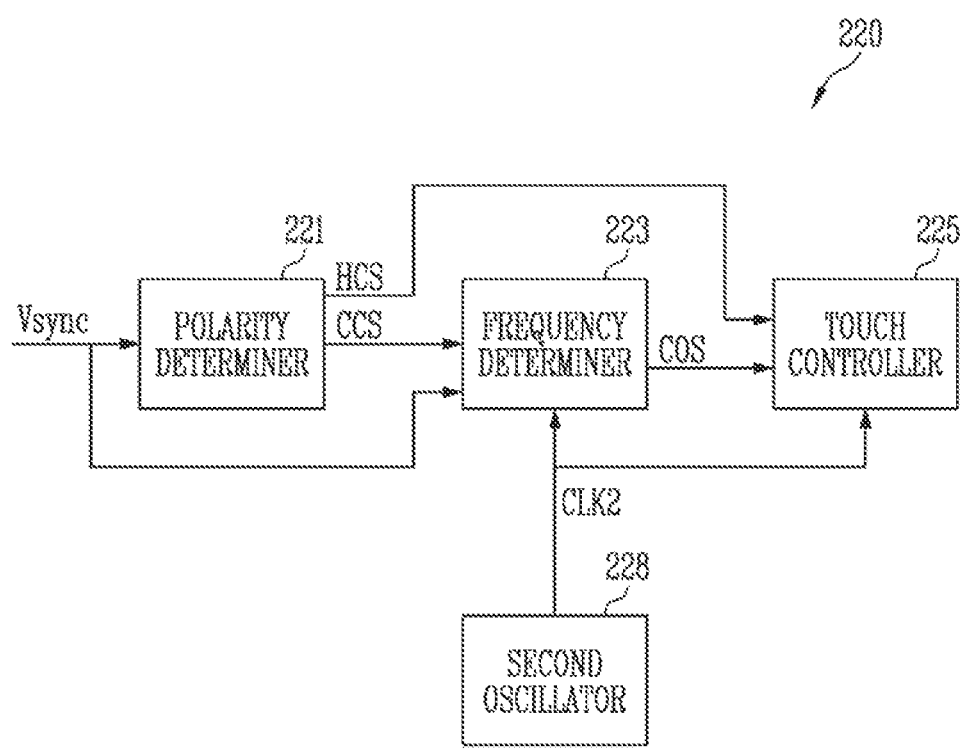
FIG. 15 is a diagram illustrating a sensor driver shown in FIG. 1 according to an embodiment of the present inventive concept.

FIG. 15 is a diagram illustrating the sensor driver shown in FIG. 1 according to an embodiment of the present invention. In FIG. 15, a configuration for the description of the disclosure is shown.

Referring to FIG. 15, the sensor driver 220 according to an embodiment of the present invention may include a polarity determiner 221 (e.g., a polarity determining circuit), a frequency determiner 223 (e.g., a frequency determining circuit), a touch controller 225, and a second oscillator 228.

The second oscillator 228 (or a sensor oscillator) may generate a second clock signal CLK2 (or, e.g., a sensor clock signal) to be used inside the sensor driver 220. Here, the second clock signal CLK2 may have a high frequency (for example, a frequency equal to or higher than 1 MHZ).

The polarity determiner 221 may determine the polarity of the vertical synchronization signal Vsync supplied from the display driver 210. For example, the polarity determiner 221 may determine whether the vertical synchronization signal Vsync is a logic low level or a logic high level.

The polarity determiner 221 may generate a maintenance control signal HCS and supply the maintenance control signal HCS to the touch controller 225 when the pulse polarity of the vertical synchronization signal Vsync is equally maintained. The polarity determiner 221 may generate a change control signal CCS and supply the change control signal CCS to the frequency determiner 223 when the pulse polarity of the vertical synchronization signal Vsync is changed.

For example, the polarity determiner 221 may generate the maintenance control signal HCS and supply the maintenance control signal HCS to the touch controller 225 at a first time point t1 of FIG. 12A and a third time point t3 of FIG. 12B. For example, the polarity determiner 221 may generate the change control signal CCS and supply the change control signal CCS to the frequency determiner 223 at a second time point t2 of FIG. 12A and a fourth time point t4 of FIG. 12B.

When the change control signal CCS is supplied, the frequency determiner 223 may count the width of the first pulse FP of the vertical synchronization signal Vsync of which the polarity is inverted. For example, the frequency determiner 223 may include a counter, and may generate a counting signal COS by counting the width of the first pulse FP by using the second clock signal CLK2. The counting signal COS generated in the frequency determiner 223 may be supplied to the touch controller 225.

In an embodiment of the present invention, the frequency determiner 223 may generate counting signals COS having different count values in response to the width of the first pulse FP.

For example, as shown in FIGS. 13A and 13B, the frequency determiner 223 may generate a counting signal COS having a first count value CN1 in response to the first pulse FP of 60 Hz, and may generate a counting signal COS having a second count value CN2 in response to the first pulse FP of 80 Hz. In addition, the frequency determiner 223 may generate a counting signal COS having a third count value CN1 in response to the first pulse FP of 120 Hz. For example, the second count value CN2 may be less than the first count value CN1. For example, the third count value CN3 may be less than the second count value CN2.

For example, as shown in FIGS. 14A and 14B, the frequency determiner 223 may generate a counting signal COS having a first count value CN1a in response to the first pulse FP of 120 Hz, and may generate a counting signal COS having a second count value CN2a in response to the first pulse FP of 80 Hz. In addition, the frequency determiner 223 may generate a counting signal COS having a third count value CN3a in response to the first pulse FP of 120 Hz. For example, the second count value CN2a may be less than the first count value CN1a. For example, the third count value CN3a may be less than the second count value CN2a.

The touch controller 225 may control an overall operation of the sensor driver 220. The sensor transmitter TDC and the sensor receiver TSC may be included in the touch controller 225. The touch controller 225 may divide the second clock signal CLK2 to generate various signals (for example, the touch signal and the like). Here, a period (or a frequency) of the various signals generated in the touch controller 225 may be set differently in response to the driving frequency.

In an embodiment of the present invention, when the maintenance control signal HCS is input from the polarity determiner 221, the touch controller 225 may determine that the driving frequency is the same as before, and may generate various signals in response to a previous driving frequency.

In an embodiment of the present invention, when the counting signal COS is input from the frequency determiner 223, the touch controller 225 may determines that the driving frequency is changed, and detect the driving frequency in response to count values CN and CNa included in the counting signal COS. Thereafter, the touch controller 225 may generate various signals in response to the changed driving frequency.

In an embodiment of the present invention, the sensor driver 220 may determine the driving frequency in real time using the polarity of the vertical synchronization signal Vsync and the width of the first pulse FP. In this case, the sensor driver 220 and the display driver 210 may generate various signals in response to the same driving frequency, and thus, display quality of the display device 1 may be increased.

In addition, in an embodiment of the present invention, the frequency determiner 223 counts the width of the first pulse FP of the vertical synchronization signal Vsync in a case where the change control signal CCS is supplied. That is, the frequency determiner 223 may be driven in a case where the driving frequency is changed, and thus, power consumption may be reduced. For example, the frequency determiner 223 may be driven only in a case where the driving frequency is changed.

For example, when the polarity of the vertical synchronization signal Vsync is the same, the period of the vertical synchronization signal Vsync is to be continuously counted to determine the driving frequency. In addition, when the polarity of the vertical synchronization signal Vsync is inverted whenever the driving frequency is changed as in the disclosure, only the width of the first pulse FP of which the polarity is inverted may be counted, and thus, power consumption may be reduced.

Figure 16:
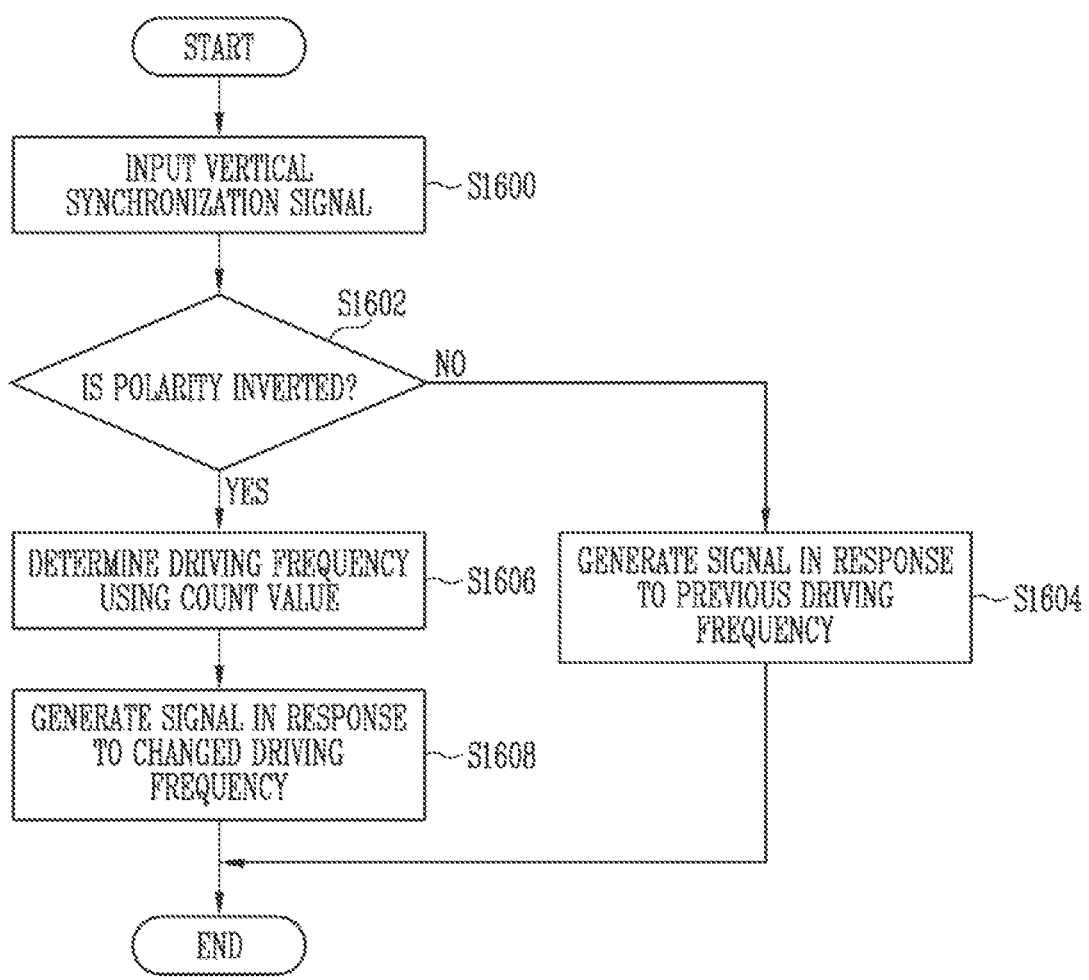
FIG. 16 is a flowchart illustrating an operation process of the sensor driver.

FIG. 16 is a flowchart illustrating an operation process of the sensor driver.

Referring to FIG. 16, first, the vertical synchronization signal Vsync may be input from the display driver 210 to the sensor driver 220 (S1600). Thereafter, the polarity determiner 221 included in the sensor driver 220 may determine whether the pulse polarity of the vertical synchronization signal Vsync is inverted (S1602).

In step S1602, when the pulse polarity of the vertical synchronization signal Vsync is not inverted (that is, when the pulse polarity is maintained as the same logic level), the polarity determiner 221 may generate the maintenance control signal HCS and supply the maintenance control signal HCS to the touch controller 225. In addition, the touch controller 225 may generate various signals in response to the previous driving frequency (S1604).

In step S1602, when the pulse polarity of the vertical synchronization signal Vsync is inverted (that is, the pulse polarity is changed to a different logic level), the polarity determiner 221 may generate the change control signal CCS and supply the change control signal CCS to the frequency determiner 223. The frequency determiner 223 receiving the change control signal CCS may count the first pulses FP to generate the counting signal COS, and supply the generated counting signal COS to the touch controller 225.

The touch controller 225 receiving the counting signal COS may determine the changed driving frequency using the count values CN and CNa included in the counting signal COS (S1606), and may generate various signals in response to the changed driving frequency (S1608).

Figure 17:
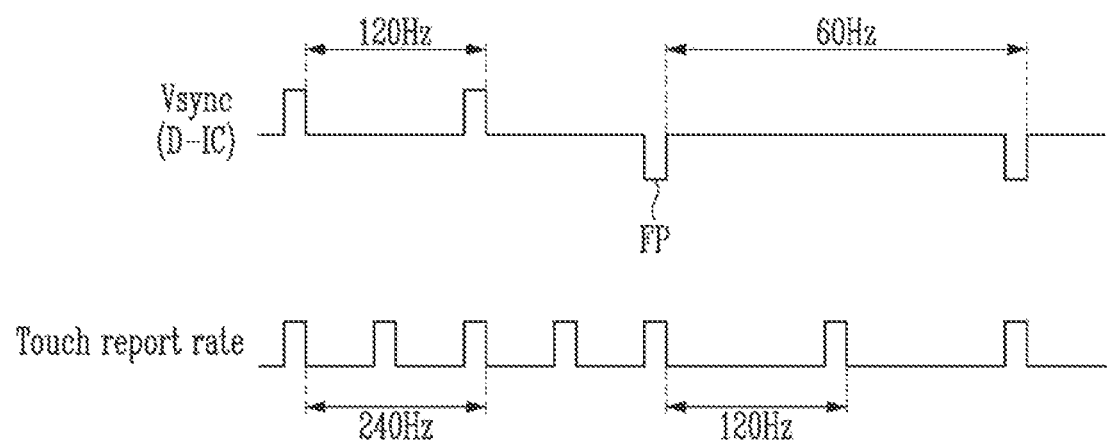
FIG. 17 is a diagram illustrating a touch report rate corresponding to a vertical synchronization signal according to an embodiment of the present invention.

FIG. 17 is a diagram illustrating a touch report rate corresponding to a vertical synchronization signal according to an embodiment of the present invention. Although FIG. 17 shows a case where the touch report rate is twice that of the driving frequency, an embodiment of the present invention is not limited thereto. For example, the touch report rate may be set to various frequencies in association with the driving frequency.

Referring to FIG. 17, the vertical synchronization signal Vsync generated in the display driver 210 may be supplied to the sensor driver 220, and the sensor driver 220 may determine the driving frequency in real time using the polarity of the vertical synchronization signal Vsync or the width of the first pulse FP of which the polarity is inverted. In this case, the sensor driver 220 may transmit the touch input coordinate and the like at the touch report rate corresponding to the driving frequency without frame delay.

Figure 18:
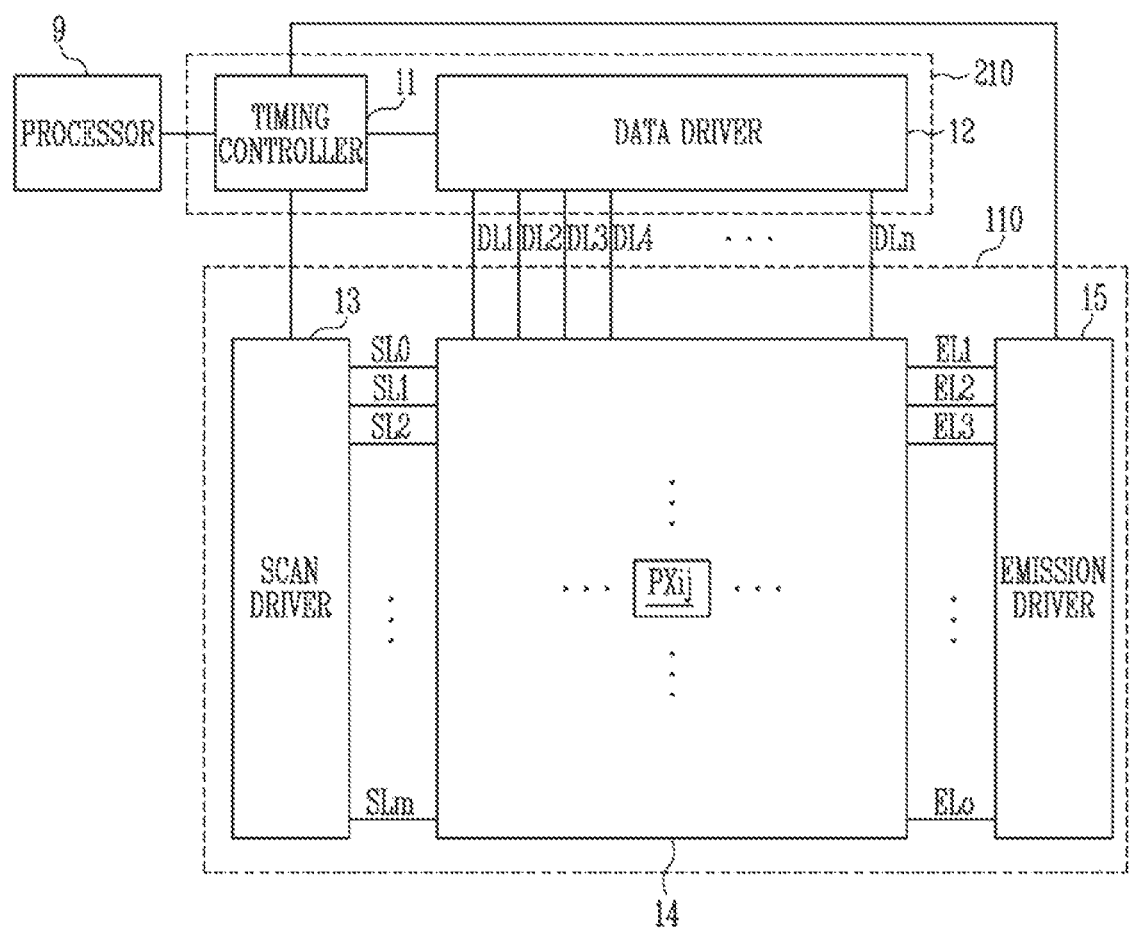
FIG. 18 is a diagram illustrating a display unit and a display driver according to an embodiment of the present invention.

FIG. 18 is a diagram illustrating a display unit and a display driver according to an embodiment of the present invention.

Referring to FIG. 18, the display driver 210 may include a timing controller 11 and a data driver 12, and the display unit 110 may include a scan driver 13 and an emission driver 15. However, as described above, whether each functional unit is integrated into one IC, into a plurality of ICs, or mounted on the display substrate 111 may be variously configured according to a specification of the display device 1. Additionally, the timing controller 11 may include the signal generator 212 and the first oscillator 214 shown in FIG. 11.

The timing controller 11 may receive grayscales and timing signals (or the control signals CS shown in FIG. 11) for each display frame period from a processor 9. Here, the processor 9 may include at least one of, for example, a graphics processing unit (GPU), a central processing unit (CPU), and/or an application processor (AP).

The grayscales may be supplied in a horizontal line unit in each horizontal period. The horizontal line may refer to pixels (for example, a pixel row) connected to the same scan line.

The timing controller 11 may render the grayscales to correspond to the specification of the display device 1 (or the pixel unit 14). For example, the processor 9 may provide a red grayscale, a green grayscale, and a blue grayscale for each unit dot. For example, when the pixel unit 14 has an RGB stripe structure, the pixel may correspond to each grayscale one-to-one. In this case, rendering of the grayscales may be unnecessary. However, for example, when the pixel unit 14 has a PENTILET structure, since adjacent unit dots share the pixel, the pixel might not correspond to each grayscale one-to-one. In this case, rendering of the grayscales may be necessary. The grayscales which are rendered or not rendered may be provided to the data driver 12. In addition, the timing controller 11 may provide a data control signal to the data driver 12. In addition, the timing controller 11 may provide a scan control signal to the scan driver 13.

The data driver 12 may generate data voltages (or, e.g., a data signal) to be provided to data lines DL1 to DLn (for example, n is a natural number) using the grayscales and the data control signal received from the timing controller 11.

The scan driver 13 may generate scan signals to be provided to scan lines SL0 to SLm (for example, m is a natural number) using a clock signal, a scan start signal, and the like received from the timing controller 11. The scan driver 13 may sequentially supply scan signals having a turn-on level of pulse to the scan lines SL0 to SLm. For example, the scan driver 13 may supply turn-on level of scan signals to the scan lines at a cycle corresponding to a cycle of the horizontal synchronization signal Hsync during an active period in which the grayscales are supplied. The scan driver 13 may include scan stages configured in a form of a shift register. The scan driver 13 may generate the scan signals in a method of sequentially transferring the scan start signal which is a pulse form of a turn-on level to a next scan stage under control of the clock signal.

The emission driver 15 may generate emission signals to be provided to emission lines EL1 to ELo using an emission control signal (for example, a clock signal, an emission stop signal, and the like) received from the timing controller 11. The emission driver 15 may sequentially supply emission signals that have a turn-off level of pulse to the emission lines EL1 to ELo. The emission driver 15 may include emission stages configured in a form of a shift register. The emission driver 15 may generate the emission signals in a method of sequentially transferring the emission stop signal which is a pulse form of a turn-off level to a next emission stage according to control of the clock signal.

The pixel unit 14 includes the pixels PX. Each of the pixels PX may be connected to corresponding data line and scan line. For example, the pixel PXij may be connected to an i-th scan line and a j-th data line. The pixels may include pixels emitting light of a first color, pixels emitting light of a second color, and pixels emitting light of a third color. The first color, the second color, and the third color may be different colors. For example, the first color may be one of red, green, and blue, the second color may be one other than the first color among red, green, and blue, and the third color may be one other than the first color and the second color among red, green, and blue. In addition, magenta, cyan, and yellow may be used instead of red, green, and blue as the first to third colors.

Figure 19:
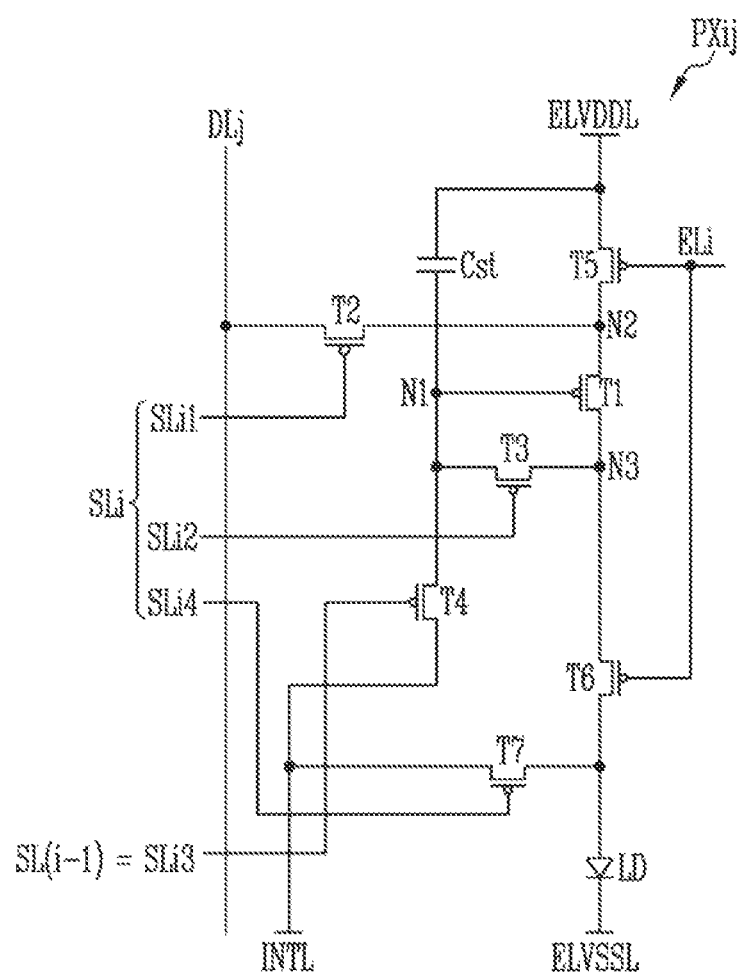
FIG. 19 is a diagram illustrating a pixel according to an embodiment of the present invention.

FIG. 19 is a diagram illustrating a pixel according to an embodiment of the present invention.

Referring to FIG. 19, the pixel PXij includes transistors T1, T2, T3, T4, T5, T6, and T7, a storage capacitor Cst, and a light emitting element LD.

Hereinafter, a circuit configured of a P-type transistor is described as an example. However, those skilled in the art will be able to design a circuit configured of an N-type transistor by differentiating a polarity of a voltage applied to a gate terminal. Similarly, those skilled in the art will be able to design a circuit configured of a combination of a P-type transistor and an N-type transistor. The transistor may be configured in various forms such as a thin film transistor (TFT), a field effect transistor (FET), and a bipolar junction transistor (BJT).

The first transistor T1 may have a gate electrode connected to a first node N1, a first electrode connected to a second node N2, and a second electrode connected to a third node N3. The first transistor T1 may be referred to as a driving transistor.

The second transistor T2 may have a gate electrode connected to a scan line SLi1, a first electrode connected to a data line DLj, and a second electrode connected to the second node N2. The second transistor T2 may be referred to as a scan transistor.

The third transistor T3 may have a gate electrode connected to a scan line SLi2, a first electrode connected to the first node N1, and a second electrode connected to the third node N3. The third transistor T3 may be referred to as a diode connection transistor.

The fourth transistor T4 may have a gate electrode connected to a scan line SLi3, a first electrode connected to the first node N1, and a second electrode connected to an initialization line INTL. The fourth transistor T4 may be referred to as a gate initialization transistor.

The fifth transistor T5 may have a gate electrode connected to an i-th emission line Eli, a first electrode connected to a first power line ELVDDL, and a second electrode connected to the second node N2. The fifth transistor T5 may be referred to as an emission transistor. In an embodiment of the present invention, the gate electrode of the fifth transistor T5 may be connected to an emission line that is different from an emission line connected to a gate electrode of the sixth transistor T6.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In an embodiment of the present invention, the gate electrode of the sixth transistor T6 may be connected to the emission line that is different from the emission line connected to the gate electrode of the fifth transistor T5.

The seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power line ELVDDL and a second electrode of the storage capacitor Cst may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be, for example, an organic light emitting element (organic light emitting diode), an inorganic light emitting element (inorganic light emitting diode), a quantum dot/well light emitting element (quantum dot/well light emitting diode), or the like. The light emitting element LD may emit light in any one of the first color, the second color, and the third color. In addition, although only one light emitting element LD is provided in each pixel in the present embodiment, a plurality of light emitting elements may be provided in each pixel in an embodiment of the present invention. At this time, the plurality of light emitting elements may be connected in series, parallel, series-parallel, or the like.

The first power line ELVDDL may be supplied with a first power voltage, the second power line ELVSSL may be supplied with a second power voltage, and the initialization line INTL may be supplied with an initialization voltage. For example, the first power voltage may be greater than the second power voltage. For example, the initialization voltage may be equal to or greater than the second power voltage. For example, the initialization voltage may correspond to a data voltage of the smallest voltage among data voltage that may be provided. In an example, a magnitude of the initialization voltage may be less than a magnitude of the data voltages that may be provided.

Figure 20:
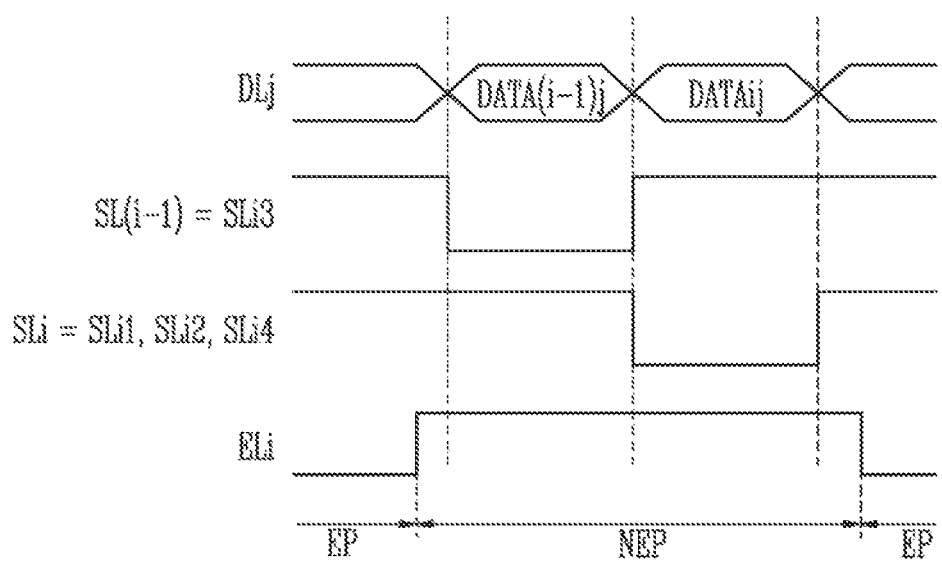
FIG. 20 is a diagram illustrating a method of driving the pixel of FIG. 19.

FIG. 20 is a diagram illustrating a method of driving the pixel of FIG. 19.

Hereinafter, for convenience of description, it is assumed that the scan lines SLi1, SLi2, and SLi4 are i-th scan lines SLi, and the scan line SLi3 is an (i−1)-th scan line SL(i−1). However, a connection relationship of the scan lines SLi1, SLi2, SLi3, and SLi4 may be various according to embodiments of the present invention. For example, the scan line SLi4 may be the (i−1)-th scan line or an (i+1)-th scan line.

First, an emission signal of a turn-off level (logic high level) is applied to the i-th emission line ELi, a data voltage DATA (i−1)j for an (i−1)-th pixel is applied to the data line DLj, and a scan signal of a turn-on level (logic low level) is applied to the scan line SLi3. The high/low of the logic level may vary according to whether a transistor is a P-type or an N-type.

In addition, since a scan signal of a turn-off level is applied to the scan lines SLi1 and SLi2, the second transistor T2 is turned off and the data voltage DATA(i−1)j is prevented from being input to the pixel PXij.

In addition, since the fourth transistor T4 is turned on, the first node N1 is connected to the initialization line INTL, and a voltage of the first node N1 is initialized. Since the emission signal of the turn-off level is applied to the emission line Ei, the transistors T5 and T6 are turned off, and unnecessary light emission of the light emitting element LD according to an initialization voltage application process is prevented.

A data voltage DATAij for the i-th pixel PXij is applied to the data line DLj, and the scan signal of the turn-on level is applied to the scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

In addition, when the scan line SLi4 is the i-th scan line, since the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light emitting element LD, and the second power line ELVSSL to each other is formed.

A driving current amount flowing to the first electrode and the second electrode of the first transistor T1 is adjusted according to the voltage maintained in the storage capacitor Cst. The light emitting element LD emits light with a luminance corresponding to the driving current amount. The light emitting element LD emits light until the emission signal of the turn-off level is applied to the emission line Ei.

When the emission signal is the turn-on level, pixels receiving the corresponding emission signal may be in a display state. Therefore, a period in which the emission signal is the turn-on level may be referred to as an emission period EP (or an emission allowable period). In addition, when the emission signal is the turn-off level, pixels receiving the corresponding emission signal may be in a non-display state. Therefore, a period in which the emission signal is the turn-off level may be referred to as a non-emission period NEP (or an emission disallowable period).

The non-emission period NEP described with reference to FIG. 20 is for preventing the pixel PXij from emitting light with an undesired luminance during the initialization period and the data writing period.

One or more non-emission periods NEP may be additionally provided while data written to the pixel PXij is maintained (for example, one frame period). This may be for effectively expressing a low grayscale by reducing the emission period EP of the pixel PXij, or for smoothly blurring a motion of an image.

FIGS. 21 to 27 are diagrams illustrating an the display device according to an embodiment of the present invention. Reference numerals of FIGS. 21 to 27 and reference numerals of FIGS. 1 to 20 are independent of each other.

Figure 21:
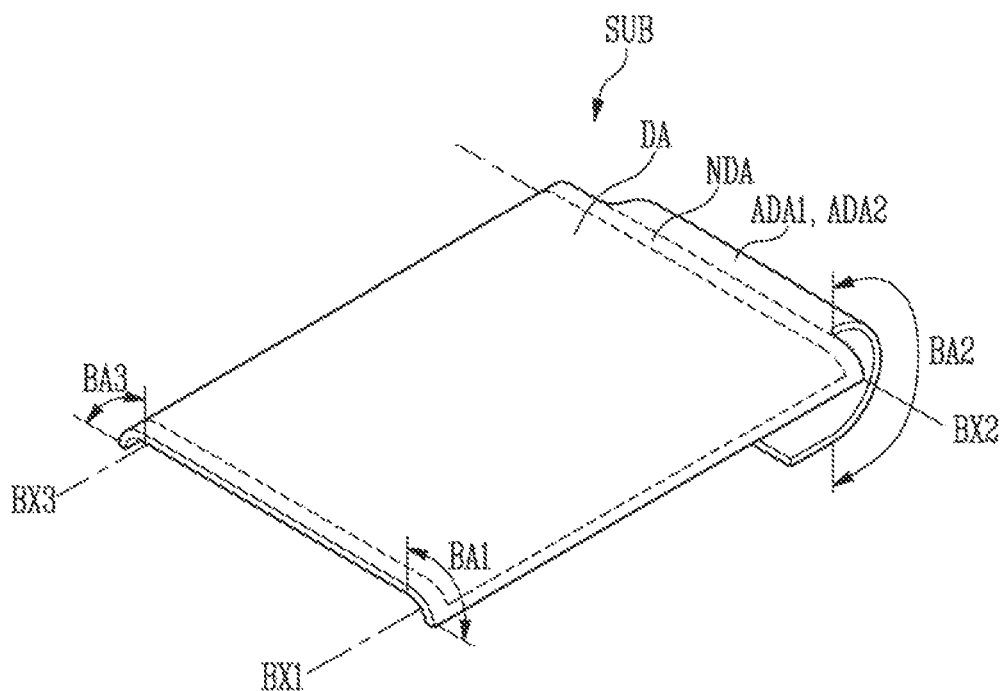
FIGS. 21, 22, 23, 24, 25, 26, and 27 are diagrams illustrating a configuration of the display device according to an embodiment of the present inventive concept.
Figure 22:
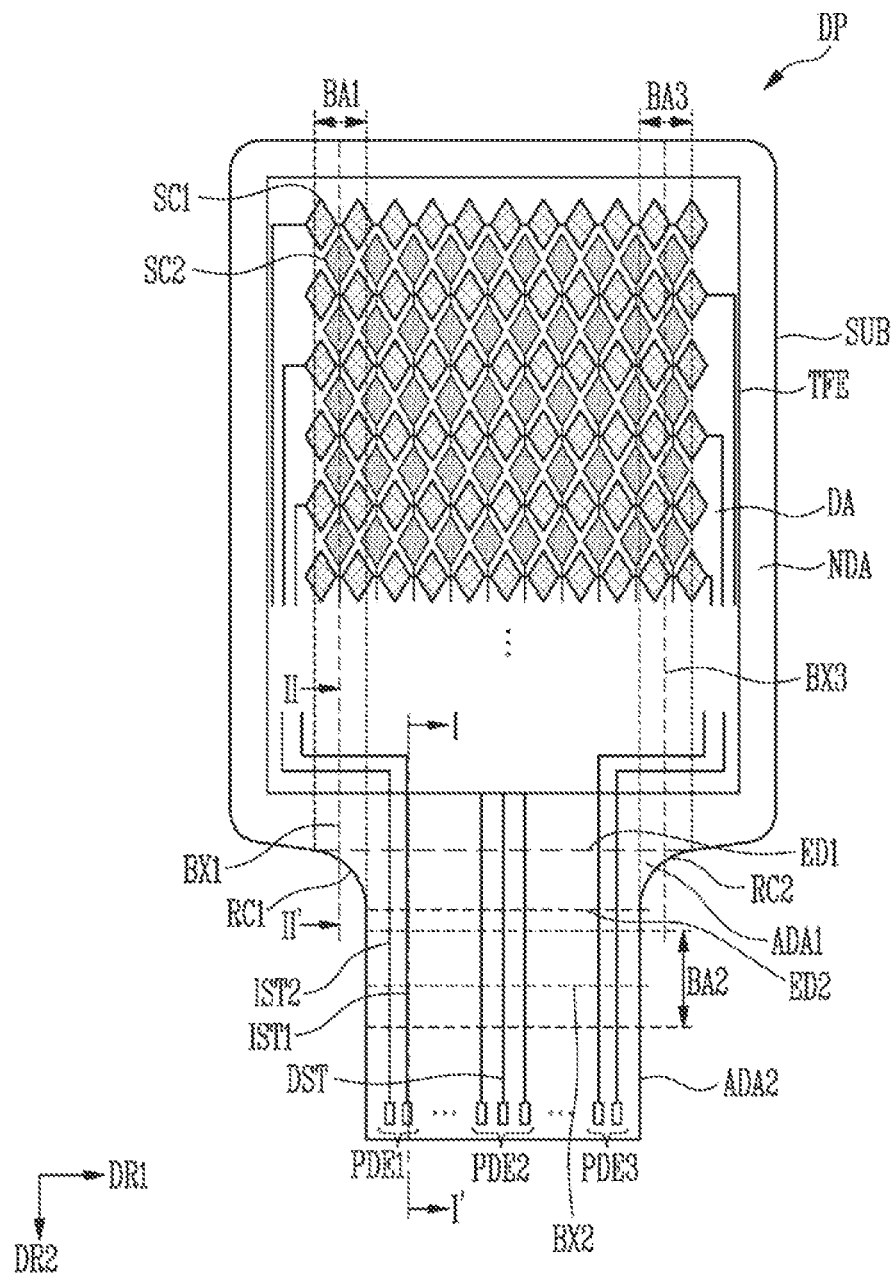

FIG. 21 is a diagram illustrating a substrate according to an embodiment of the present invention, and FIG. 22 is a diagram illustrating a display device according to an embodiment of the present invention.

In the following embodiments of the present invention, a plane may be formed by a first direction DR1 and a second direction DR2 crossing each other (e.g., being substantially perpendicular to each other), and a height may be defined in a third direction DR3 (refer to FIGS. 22 and 23). The first direction DR1, the second direction DR2, and the third direction DR3 may be directions that are orthogonal to each other.

The substrate SUB may include a display area DA, a non-display area NDA, a first additional area ADA1, and a second additional area ADA2.

The display area DA may have a rectangular shape. Each corner of the display area DA may be an angular shape or a curved shape. In addition, in a case of a circular display, the display area DA may have a circular shape. In addition, the display area DA may have a polygonal shape or rounded shape other than a quadrangle, an ellipse, or the like. As described above, a shape of the display area DA may be set differently according to a product.

Pixels may be positioned on the display area DA. Each of the pixels may include a light emitting diode or may include a liquid crystal layer according to a type of a display device DP.

The non-display area NDA may be adjacent to an outer periphery of the display area DA. For example, the non-display area NDA may at least partially surround an outer periphery of the display area DA. For example, the non-display area NDA may have a rectangular shape. Each corner of the non-display area NDA may be an angular shape or a curved shape. FIG. 22 is shown, as an example, where corners of the non-display area NDA have a curved shape. According to an embodiment of the present invention, non-display area NDA may have a circular shape. Since minimizing the non-display area NDA is advantageous to a narrow bezel structure, a shape of the non-display area NDA may be similar to the shape of the display area DA.

The first additional area ADA1 may be positioned between the non-display area NDA and the second additional area ADA2. The first additional area ADA1 may be connected to the non-display area NDA at a first boundary ED1 that is between the non-display area NDA and the first additional area ADA1. The first additional area ADA1 may be connected to the second additional area ADA2 at a second boundary ED2 that is between the first additional area ADA1 and the second additional area ADA2. Each of the first boundary ED1 and the second boundary ED2 may extend in the first direction DR1.

A width of the first additional area ADA1 may be narrower from the first boundary ED1 to the second boundary ED2. For example, the width of the first additional area ADA1 in the first direction DR1 may be narrower toward the second direction DR2. For example, the first additional area ADA1 may include a curved first side RC1 and a second side RC2. For example, sides RC1 and RC2 may be convex toward an inside of the substrate (for example, a center of the substrate). However, the present invention is not limited thereto. For example, the side RC1 and the second side RCE2 may each be straight and may each form an angle, which may be different from a ninety degree angle, with respect to the first boundary ED1 and the second boundary ED2. For example, the first additional area ADA1 may have a tapered shape.

FIG. 22 shows that the first additional area ADA1 includes the two sides RC1 and RC2 in the first direction DR1 and a direction opposite to the first direction DR1. In an embodiment of the present invention, a boundary positioned in the first direction DR1 may coincide with a boundary of the non-display area NDA, and thus, the first additional area ADA1 may include only the first side RC1. In an embodiment of the present invention, a boundary positioned in the direction opposite to the first direction DR1 may coincide with the boundary of the non-display area NDA, and thus, the first additional area ADA1 may include only the second side RC2.

The second additional area ADA2 may have a rectangular shape. Each corner positioned in the second direction DR2 of the second additional area ADA2 may be an angular shape or a curved shape. FIG. 22 is shown under an assumption that each corner positioned in the second direction DR2 of the second additional area ADA2 is an angular shape.

An encapsulation layer TFE may be positioned on the pixels. For example, the encapsulation layer TFE may cover the pixels in the display area DA and a boundary of the encapsulation layer TFE may be positioned in the non-display area NDA. The encapsulation layer TFE may cover light emitting elements and circuit elements of the pixels of the display area DA, thereby preventing breakage from external moisture or impact.

Sensing electrodes SC1 and SC2 (for example, the sensors TX and RX shown in FIG. 1) may be positioned on the encapsulation layer TFE. The sensing electrodes SC1 and SC2 may sense touch, hovering, gesture, proximity, and the like by a body of a user. The sensing electrodes SC1 and SC2 may include different shapes according to various methods such as a resistive type, a capacitive type, an electromagnetic type (EM), and an optical type. For example, the sensing electrodes SC1 and SC2 may include the same shape as each other. For example, when the sensing electrodes SC1 and SC2 are configured in the capacitive type, the sensing electrodes SC1 and SC2 may be driven in a self-capacitance mode, a mutual-capacitance mode, or the like.

When the sensing electrodes SC1 and SC2 are driven in the mutual-capacitance mode, the touch signal may be transmitted through a sensing line corresponding to the first sensing electrode SC1, and the sensing signal may be received through a sensing line corresponding to the second sensing electrode SC2 forming a mutual capacitance with the first sensing electrode SC1. When the body of the user is in proximity of the sensing electrodes SC1 and SC2, the mutual capacitance between the first sensing electrode SC1 and the second sensing electrode SC2 may be changed, and thus, touch-or-not of the user may be detected in accordance with a difference of a touch signal according to the change of the mutual capacitance between the first sensing electrode SC1 and the second sensing electrode SC2. In an embodiment of the present invention, the touch signal may be transmitted through the sensing line corresponding to the second sensing electrode SC2, and the sensing signal may be received through the sensing line corresponding to the first sensing electrode SC1 forming a mutual capacitance with the second sensing electrode SC2.

Pads PDE1, PDE2, and PDE3 may be positioned on the second additional area ADA2. The pads PDE1 and PDE3 may be connected to the sensing electrodes SC1 and SC2 that are positioned above the encapsulation layer through the sensing lines IST1 and IST2. The pads PDE1 and PDE3 may be connected to an external touch integrated chip (IC). In addition, the pads PDE2 may be connected to the pixels positioned under the encapsulation layer TFE or a driver of the pixels through display lines DST. The driver may include a scan driver, an emission driver, a data driver, and the like. The driver may be positioned under the encapsulation layer TFE or may be positioned in an external display IC that is connected through the pads PDE2.

When the display device DP is driven in the mutual-capacitance mode, a touch IC may transmit the touch signal through the first sensing line IST1 and receive the sensing signal through the second sensing line IST2. In an embodiment of the present invention, the touch signal may be transmitted through the second sensing line IST2 and the sensing signal may be received through the first sensing line IST1. For reference, when the display device DP is driven the self-capacitance mode, a driving method of the first sensing line IST1 and the second sensing line IST2 may be the same as each other. The display lines DST may include a control line, a data line, a power line, and the like, and may provide signals so that the pixels may display an image. The signals may be provided from the driver connected to the display lines DL.

FIG. 21 shows a state in which the substrate SUB is bent, and FIG. 22 shows a state in which the substrate SUB is not bent. The display device DP may be bent as shown in FIG. 21 after elements are stacked on the substrate SUB in a state in which the display device DP is not bent as shown in FIG. 22.

The substrate SUB may include a first bending area BA1 extending from the first side RC1 of the first additional area ADA1 to overlap the non-display area NDA. Additionally, the first bending area BA1 may be extended to overlap the display area DA. For example, each of the display area DA, the non-display area NDA, and the first additional area ADA1 may partially overlap the first bending area BA1. The first bending area BA1 may have a width of the first direction DR1 and a length extending in the second direction DR2. A first bending axis BX1 may be a folding line extending in the second direction DR2 along a center of the first bending area BA1. According to an embodiment of the present invention, the first bending area BA1 may be a portion where a stress is reduced due to removal of a portion of an insulating layer or the like, which is different from another portion that is adjacent to the first bending area BA1. According to an embodiment of the present invention, the first bending area BA1 may have the same configuration as the other portion that is adjacent to the first bending area BA1.

The substrate SUB may include a third bending area BA3 extending from the second side RC2 of the first additional area ADA1 to overlap the non-display area NDA. Additionally, the third bending area BA3 may extend to overlap the display area DA. For example, each of the display area DA, the non-display area NDA, and the first additional area ADA1 may partially overlap the third bending area BA3. The third bending area BA3 may have a width of the first direction DR1 and a length extending in the second direction DR2.

A third bending axis BX3 may be a folding line extending in the second direction DR2 along a center of the third bending area BA3. According to an embodiment of the present invention, the third bending area BA3 may be a portion where the stress is reduced by removal of a portion of the insulating layer or the like, which is different from another portion that is adjacent to the third bending area BA3. According to an embodiment of the present invention, the third bending area BA3 may have the same configuration as the other portion that is adjacent to the third bending area BA3.

The second additional area ADA2 may include a second bending area BA2. The second bending area BA2 may have a width of the second direction DR2 and a length extending in the first direction DR1. A second bending axis BX2 may be a folding line extending in the first direction DR1 along a center of the second bending area BA2. According to an embodiment of the present invention, the second bending area BA2 may be a portion where the stress is reduced due to removal of a portion of the insulating layer or the like, which is differently from another portion that is adjacent to the second bending area BA2. According to an embodiment of the present invention, the second bending area BA2 may have the same configuration as the other portion that is adjacent to the second bending area BA2.

The first to third bending areas BA1, BA2, and BA3 might not overlap with each other.

Here, the term "folded" is intended to mean that a shape is not fixed and may be modified from its original shape to another shape, and may include being folded, curved, or rolled along one or more bending axes. A side bezel width of the first direction DR1 and the direction opposite to the first direction DR1 of the display device DP may be reduced by the first and third bending areas BA1 and BA3. In addition, a side bezel width of the second direction DR2 of the display device DP may be reduced by the second bending area BA2.

Figure 23:
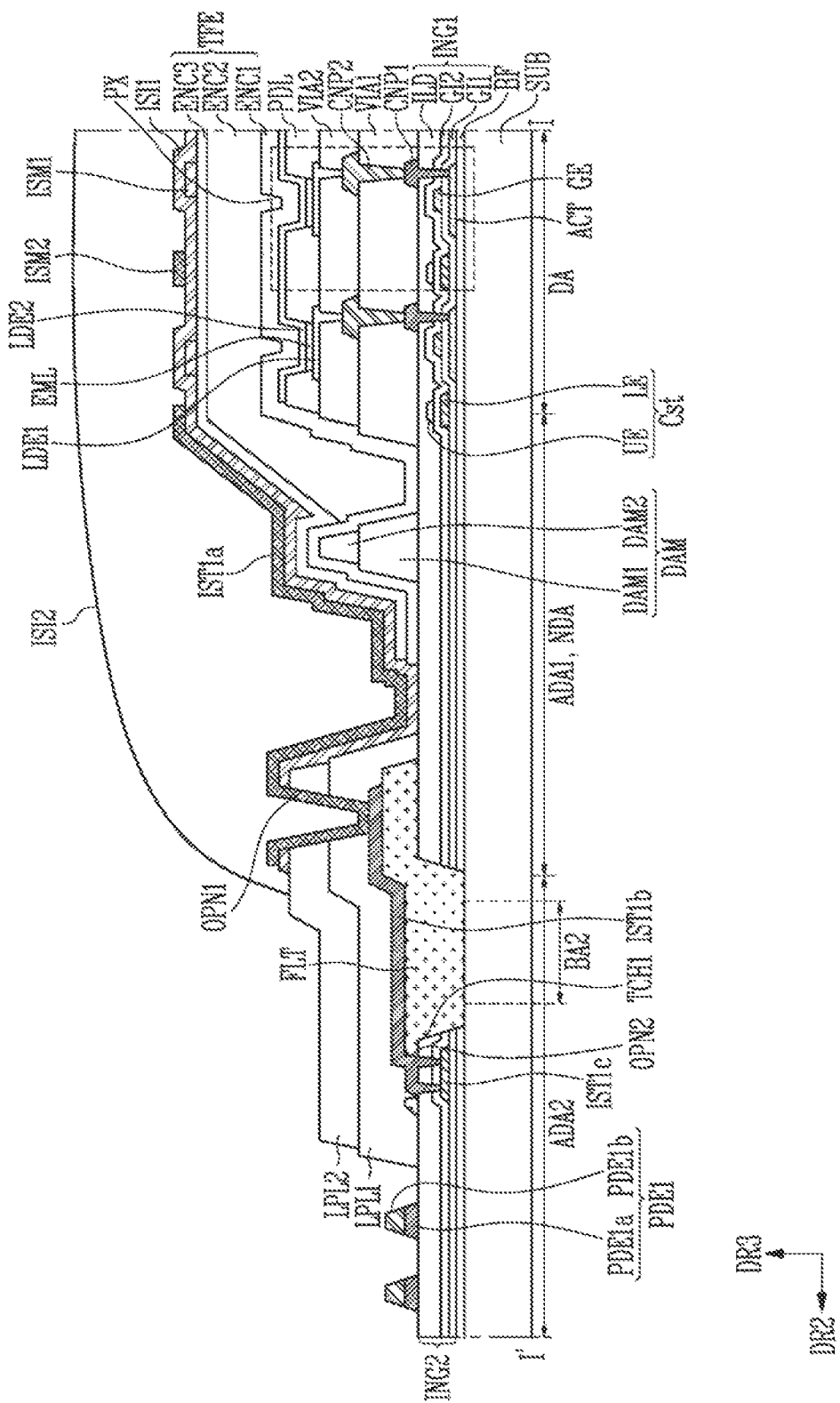

FIG. 23 is a cross-section taken along a line I-I' of FIG. 22 according to an embodiment of the present invention. It is assumed that the line I-I' of FIG. 22 passes through the first pad PDE1 and the first sensing line IST1.

First, the display area DA is described. In an embodiment of the present invention, pixels PX are provided in the display area DA. Each pixel PX may include a transistor, which is connected to a corresponding line of the display lines DST, a light emitting element, which is connected to the transistor, and a capacitor Cst. In FIG. 23, for convenience of description, one pixel PX is shown as an example.

The substrate SUB may be formed of an insulating material such as glass, or resin. In addition, the substrate SUB may be formed of a material having flexibility so as to be bent or folded, and may have a single layer structure or a multiple layer structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate. However, a material forming the substrate SUB may be variously changed, and may be formed of fiber reinforced plastic (FRP) or the like.

For example, when the substrate SUB has the multiple layer structure, inorganic materials such as silicon nitride, silicon oxide, and silicon oxynitride may be interposed between a plurality of layers in a single layer or a plurality of layers.

A buffer layer BF may cover the substrate SUB. The buffer layer BF may prevent an impurity from diffusing into a channel of the transistor. The buffer layer BF may be an inorganic insulating layer formed of an inorganic material. For example, the buffer layer BF may include at least one of silicon nitride, silicon oxide, silicon oxynitride or the like, and may be omitted according to the material of the substrate SUB and a process condition. According to an embodiment of the present invention, a barrier layer may be provided.

An active layer ACT may be positioned on the buffer layer BF. The active layer ACT may be patterned to configure the channel, a source electrode, and a drain electrode of the transistor, or configure a line. The active layer ACT may be formed of a semiconductor material. The active layer ACT may be a semiconductor pattern formed of, for example, polysilicon, amorphous silicon, oxide semiconductor, or the like. The channel of the transistor may be a semiconductor pattern which is not doped with an impurity, and may be an intrinsic semiconductor. The source electrode, the drain electrode, and the line may be a semiconductor pattern doped with an impurity. The impurity may include an n-type impurity, a p-type impurity, and other metals may be used.

A first gate insulating layer GI1 may cover the active layer ACT. The first gate insulating layer GI may be an inorganic insulating layer formed of an inorganic material. The inorganic insulating material may include, for example, polysiloxane, silicon nitride, silicon oxide, or silicon oxynitride may be used.

A gate electrode GE of the transistor and a lower electrode LE of the capacitor Cst may be positioned on the first gate insulating layer GI1. The gate electrode GE may overlap an area corresponding to the channel. The gate electrode GE and the lower electrode LE may be formed of a metal. For example, the gate electrode GE may be formed of at least one of a metal such as gold (Au), silver (Ag), aluminum (Al), molybdenum (Mo), chromium (Cr), titanium (Ti), nickel (Ni), neodymium, or copper (Cu), or an alloy of the metals. In addition, the gate electrode GE may be formed of a single layer, but is not limited thereto, and may be formed of multiple layers in which two or more materials of metals and/or alloys are stacked.

A second gate insulating layer GI2 may cover the gate electrode GE and the lower electrode LE. The second gate insulating layer GI2 may be an inorganic insulating layer formed of an inorganic material. The inorganic material may include, for example, polysiloxane, silicon nitride, silicon oxide, silicon oxynitride, and the like.

An upper electrode UE of the capacitor Cst may be positioned on the second gate insulating layer GI2. The upper electrode UE of the capacitor Cst may be formed of a metal. For example, the upper electrode UE may be formed of at least one of a metal such as gold (Au), silver (Ag), aluminum (Al), molybdenum (Mo), chromium (Cr), titanium (Ti), nickel (Ni), neodymium, or copper (Cu), or an alloy of metals. In addition, the upper electrode UE may be formed of a single layer, but is not limited thereto, and may be formed of multiple layers in which two or more materials of metals and alloys are stacked.

The lower electrode LE and the upper electrode UE may form the capacitor Cst with the second gate insulating layer GI2 interposed therebetween. In FIG. 23, the capacitor Cst is shown as a two layer electrode structure of the lower electrode LE and the upper electrode UE. However, in an embodiment of the present invention, the capacitor Cst may be configured as a three layer electrode structure using the active layer ACT, a three layer electrode structure using an electrode of the same layer as a first connection pattern CNP1, or an electrode structure of four or more layers.

An interlayer insulating layer ILD may cover the upper electrode UE. The interlayer insulating layer ILD may be an inorganic insulating layer formed of an inorganic material. The inorganic material may include, for example, polysiloxane, silicon nitride, silicon oxide, silicon oxynitride, and the like.

In the present embodiment, for convenience of description, the first gate insulating layer GI1, the second gate insulating layer GI2, and the interlayer insulating layer ILD may be referred to as a first insulating layer group ING1. The first insulating layer group ING1 may cover a portion of the transistor. According to an embodiment of the present invention, the first insulating layer group ING1 may further include the buffer layer BF.

The first connection pattern CNP1 may be positioned on the interlayer insulating layer ILD. The first connection pattern CNP1 may be in contact with each of the source electrode and the drain electrode of the active layer ACT through a contact hole formed through the interlayer insulating layer ILD, the second gate insulating layer GI2, and the first gate insulating layer GI1.

The first connection pattern CNP1 may be formed of a metal. For example, the source electrode SE and the drain electrode DE may be formed of at least one of a metal such as gold (Au), silver (Ag), aluminum (Al), molybdenum (Mo), chromium (Cr), titanium (Ti), nickel (Ni), neodymium, or copper (Cu), or an alloy of metals.

According to an embodiment of the present invention, a passivation layer may cover the first connection pattern CNP1. The passivation layer may be an inorganic insulating layer formed of an inorganic material. The inorganic material may include, for example, polysiloxane, silicon nitride, silicon oxide, silicon oxynitride, and the like.

A first via layer VIA1 may cover the passivation layer or the transistor. For example, the first via layer VIA1 may be disposed on the first insulating group ING1 and the first connection pattern CNP1. The first via layer VIA1 may be an organic insulating layer formed of an organic material. The organic material may include, for example, an organic insulating material such as a polyacrylic compound, a polyimide compound, a fluorocarbon compound such as Teflon, or a benzocyclobutene compound may be used. The organic layer may be deposited by a method such as evaporation.

The second connection pattern CNP2 may be connected to the first connection pattern CNP1 through an opening of the first via layer VIA1. The second connection pattern CNP2 may be formed of at least one of a metal such as gold (Au), silver (Ag), aluminum (Al), molybdenum (Mo), chromium (Cr), titanium (Ti), nickel (Ni), neodymium, or copper (Cu), or an alloy of metals.

The second via layer VIA2 may cover the first via layer VIA1 and the second connection pattern CNP2. The second via layer VIA2 may be an organic insulating layer formed of an organic material. The organic material may include, for example, an organic insulating material such as a polyacrylic compound, a polyimide compound, a fluorocarbon compound such as Teflon, or a benzocyclobutene compound.

A first light emitting element electrode LDE1 may be connected to the second connection pattern CNP2 through an opening of the second via layer VIA2. Here, the first light emitting element electrode LDE1 may be an anode of the light emitting element according to an embodiment of the present invention.

According to an embodiment of the present invention, a configuration of the second via layer VIA2 and the second connection pattern CNP2 may be omitted and the first light emitting element electrode LDE1 may be directly connected to a first contact electrode through the opening of the first via layer VIA1.

The first light emitting element electrode LDE1 may be formed of a metal layer such as Ag, Mg, Al, Pt, Pd, Au, Ni, Nd, Ir, Cr, or an alloy thereof, indium tin oxide (ITO), indium zinc oxide (IZO), zinc oxide (ZnO), indium tin zinc oxide (ITZO), and/or the like. The first light emitting element electrode LDE1 may be formed of one type of metal, but is not limited thereto, and may be formed of two or more types of metals, for example, an alloy of Ag and Mg.

For example, the first light emitting element electrode LDE1 may be formed of a transparent conductive layer when an image is to be provided in a downward direction of the substrate SUB, and the first light emitting element electrode LDE1 may be formed of a metal reflective layer and/or a transparent conductive layer when an image is to be provided in an upward direction of the substrate SUB.

A pixel defining layer PDL for partitioning an emission area of each pixel PX is provided on the substrate SUB on which the first light emitting element electrode LDE1 and the like are formed. The pixel defining layer PDL may be an organic insulating layer formed of an organic material. The organic material may include, for example, an organic insulating material such as a polyacrylic compound, a polyimide compound, a fluorocarbon compound such as Teflon, or a benzocyclobutene compound.

The pixel defining layer PDL may expose an upper surface of the first light emitting element electrode LDE1 and may protrude from the substrate SUB along a periphery of the pixel PX. A light emitting layer EML may be provided in an area of the pixel PX at least partially surrounded by the pixel defining layer PDL.

The light emitting layer EML may include a low molecular material or a high molecular material. Examples of the low molecular material may include copper phthalocyanine (CuPc), N,N-di (naphthalen-1-yl)-N, N'-diphenyl-benzidine (N,N'-Di (naphthalene-1-yl)-N, N'-diphenyl-benzidine (NPB), tris-8-hydroxyquinoline aluminum (Alq3), and the like. These materials may be formed by a vacuum deposition method. Examples of the high molecular material may include PEDOT, poly-phenylenevinylene (PPV), polyfluorene, and the like.

The light emitting layer EML may be provided as a single layer, but may be provided as multiple layers including various functional layers. When the light emitting layer EML is provided as the multiple layers, the light emitting layer EML may have a structure in which a hole injection layer (HIL), a hole transport layer (HTL), an emission layer (EML), an electron transport layer (ETL), an electron injection layer (EIL), and the like are stacked in a single or composite structure. The light emitting layer EML may be formed by a screen printing method, an inkjet printing method, a laser induced thermal imaging (LITI) method, or the like.

According to an embodiment of the present invention, at least a portion of the light emitting layer EML may be integrally formed over a plurality of first light emitting element electrodes LDE1, and may also be individually provided to correspond to the plurality of first light emitting element electrodes LDE1, respectively.

A second light emitting element electrode LDE2 may be provided on the light emitting layer EML. The second light emitting element electrode LDE2 may be provided for each pixel PX, but may be provided to cover most of the display area DA and may be shared by the plurality of pixels PX.

The second light emitting element electrode LDE2 may be used as a cathode or an anode according to an embodiment of the present invention. When the first light emitting element electrode LDE1 is the anode, the second light emitting element electrode LDE2 may be used as the cathode. When the first light emitting element electrode LDE1 is the cathode, the second light emitting element electrode LDE2 may be used as the anode.

The second light emitting element electrode LDE2 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO). In an embodiment of the present invention, the second light emitting element electrode LDE2 may be formed of multiple layers of two or more layers including a metal thin film, and for example, the second light emitting element electrode LDE2 may be formed of triple layers of ITO/Ag/ITO.

For example, the second light emitting element electrode LDE2 may be formed of a metal reflective layer and/or a transparent conductive layer when an image is to be provided in a downward direction of the substrate SUB, and the second light emitting element electrode LDE2 may be formed of a transparent conductive layer when an image is to be provided in an upward direction of the substrate SUB.

A set of the first light emitting element electrode LDE1, the light emitting layer EML, and the second light emitting element electrode LDE2 may be referred to as a light emitting element.

The encapsulation layer TFE may be provided on the second light emitting element electrode LDE2. The encapsulation layer TFE may be formed of a single layer, but may be formed of multiple layers. In the present embodiment, the encapsulation layer TFE may be formed of first to third encapsulation layers ENC1, ENC2, and ENC3. The first to third encapsulation layers ENC1, ENC2 and ENC3 may be formed of an organic material and/or an inorganic material. The third encapsulation layer ENC3 may be the upper most layer of the encapsulation layer and may be formed of an inorganic material. For example, the first encapsulation layer ENC1 may be an inorganic layer formed of an inorganic material, the second encapsulation layer ENC2 may be an organic layer formed of an organic material, and the third encapsulation layer ENC3 may be an inorganic layer formed of an inorganic material. Penetration of moisture or oxygen to the inorganic material is less than that of the organic material. However, since elasticity or flexibility of the inorganic material is low, the inorganic material is vulnerable to a crack. Propagation of a crack may be prevented by forming the first encapsulation layer ENC1 and the third encapsulation layer ENC3 with the inorganic material and by forming the second encapsulation layer ENC2 with the organic material. Here, a layer formed of the organic material, that is, the second encapsulation layer ENC2, may be covered by the third encapsulation layer ENC3 so that an end is not exposed to the outside. The organic material may include, for example, an organic insulating material such as a polyacrylic compound, a polyimide compound, a fluorocarbon compound such as Teflon, and/or a benzocyclobutene compound. The inorganic material may include, for example, polysiloxane, silicon nitride, silicon oxide, silicon oxynitride, and/or the like.

The light emitting layer EML forming the light emitting element may be easily damaged by moisture or oxygen from the outside. The encapsulation layer TFE may protect the light emitting elements by covering the light emitting layer EML. The encapsulation layer TFE may cover the display area DA and may extend to the non-display area NDA outside the display area DA. However, in a case of insulating layers formed of an organic material, there is an advantage in terms of flexibility, elasticity, and the like, but moisture and oxygen may be easily penetrated as compared to an insulating layer formed of an inorganic material. In an embodiment of the present invention, to prevent penetration of moisture or oxygen through insulating layers formed of an organic material, the end of the insulating layers formed of the organic material may be covered by insulating layers formed of an inorganic material so as not to be exposed to the outside. For example, the first via layer VIA1, the second via layer VIA2, and the pixel defining layer PDL, which are formed of an organic material, do not extend continuously to the non-display area NDA, and may be covered by the first encapsulation layer ENC1. Therefore, an upper surface of the pixel defining layer PDL and sides of the first via layer VIA1, the second via layer VIA2, and the pixel defining layer PDL may be prevented from being exposed to the outside by being sealed by the encapsulation layer TFE including the inorganic material.

However, whether the encapsulation layer TFE is formed of a plurality of layers or a single material, the encapsulation layer TFE is not limited thereto and may be variously changed. For example, the encapsulation layer TFE may include a plurality of organic material layers and a plurality of inorganic material layers which are alternately stacked on each other.

A first sensing electrode layer ISM1 may be positioned on the encapsulation layer TFE. According to an embodiment of the present invention, an additional buffer layer may be positioned between the first sensing electrode layer ISM1 and the encapsulation layer TFE. The first sensing electrode layer ISM1 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO).

The first sensing insulating layer ISI1 may exist on the first sensing electrode layer IMS1. The first sensing insulating layer ISI1 may be an inorganic insulating layer formed of an inorganic material. For example, the inorganic material may include an inorganic insulating material such as polysiloxane, silicon nitride, silicon oxide, silicon oxynitride, and the like.

A second sensing electrode layer ISM2 may be disposed on the first sensing insulating layer ISI1. The second sensing electrode layer ISM2 may be formed of a metal layer such as Ag, Mg, Al, Pt, Pd, Au, Ni, Nd, Ir or Cr, and/or a transparent conductive layer such as indium tin oxide (ITO), indium zinc oxide (IZO), zinc oxide (ZnO), or indium tin zinc oxide (ITZO).

A configuration of various input sensors using the first sensing electrode layer ISM1, the first sensing insulating layer ISI1, and the second sensing electrode layer ISM2 is described later.

In the embodiment of FIG. 23, the second sensing electrode layer ISM2 may be patterned to form a first pattern IST1a of the first sensing line IST1. The second sensing insulating layer ISI2 may be positioned on the second sensing electrode layer ISM2. The second sensing insulating layer ISI2 may include an organic layer. For example, the organic material may include an organic insulating material such as a polyacrylic compound, a polyimide compound, a fluorocarbon compound such as Teflon, and/or a benzocyclobutene compound. For example, the second sensing insulating layer ISI2 may be formed of polymethyl methacrylate, polydimethylsiloxane, polyimide, acrylate, polyethylene terephthalate, polyethylene naphthalate, or the like.

Next, the non-display area NDA, the first additional area ADA1, and the second additional area ADA2 are described. Since distinction between the non-display area NDA and the first additional area ADA1 is not a characteristic in the cross-sectional view of FIG. 23, the non-display area NDA and the first additional area ADA1 are not separately described. Hereinafter, in describing the non-display area NDA and the second additional area ADA2, previously described content, that is repetitive, is omitted or briefly described to avoid repetition of description.

A dam DAM may be positioned at a boundary of the second encapsulation layer ENC2. For example, the dam DAM may be positioned between a planarization layer FLT and the second encapsulation layer ENC2. The dam DAM may be a multiple layer structure and may include, for example, a first dam DAM1 and a second dam DAM2. For example, the first and second dams DAM1 and DAM2 may be formed of an organic material. Each of the first and second dams DAM1 and DAM2 may correspond to any one of the first via layer VIA1, the second via layer VIA2, and the pixel defining layer PDL. For example, when the first dam DAM1 is formed of the same material as and through the same process as the first via layer VIA1, the second dam DAM2 may be formed of the same material through the same process as the second via layer VIA2 or the pixel defining layer PDL. In an example, when the first dam DAM1 is formed of the same material through the same process as that of the second via layer VIA2, the second dam DAM2 may be formed of the same material through the same process as that of the pixel defining layer PDL. In addition, when a spacer is formed on the pixel defining layer PDL of the display area DA, the dam DAM may also be formed using the same material as that of the spacer.

The dam DAM prevents the organic material of the second encapsulation layer ENC2 of which fluidity is strong from overflowing to the outside of the dam DAM during a process. The first and third encapsulation layers ENC1 and ENC3 formed of the inorganic material may cover the dam DAM and extend, and thus adhesion to the substrate SUB or other layers on the substrate SUB may be increased.

The first pad PDE1 may be positioned on the substrate SUB, and may be spaced apart from the planarization layer FLT. The first pad PDE1 may be supported by a second insulating layer group ING2. For example, the first pad PDE1 may be disposed on the second insulating group ING2. Insulating layers of the second insulating layer group ING2 may correspond to insulating layers of the first insulating layer group ING1, respectively. The first pad PDE1 may include a first pad electrode PDE1a and a second pad electrode PDE1b. The first pad electrode PDE1a may be formed of the same material as that of the first connection pattern CNP1. The second pad electrode PDE1b may be formed of the same material as that of the second connection pattern CNP2.

The planarization layer FLT may be positioned on the substrate SUB, and may be spaced apart from an area covered by the encapsulation layer TFE. The planarization layer FLT may be an organic insulating layer formed of an organic material. For example, the organic material may include an organic insulating material such as a polyacrylic compound, a polyimide compound, a fluorocarbon compound such as Teflon, a benzocyclobutene compound, and/or the like may be used.

In the present embodiment, the planarization layer FLT may be formed before the formation of the first connection pattern CNP1 and after the formation of the interlayer insulating layer ILD. Therefore, the planarization layer FLT and the first via layer VIA1 may be formed through different processes from each other. According to an embodiment of the present invention, the planarization layer FLT and the first via layer VIA1 may include different organic materials from each other.

One end of the planarization layer FLT may cover the first insulating layer group ING1. In addition, a portion of the planarization layer FLT corresponding to the second bending area BA2 may fill a first trench TCH1 that is between the first insulating layer group ING1 and the second insulating layer group ING2. For example, a side surface of the first insulating layer group ING1, a side surface of the second insulating layer group ING2, and an upper surface of the substrate SUB may form the first trench TCH1. Since the inorganic insulating layers have a rigidness higher than and a flexibility lower than those of the organic insulating layer, a probability of occurrence of a crack is relatively high. When the crack occurs in the inorganic insulating layers, the crack may propagate to lines on the inorganic insulating layers, and a defect such as line disconnection or the like may be generated.

Therefore, as shown in FIG. 23, the first trench TCH1 may be formed by removing the inorganic insulating layers from the second bending area BA2, and the first insulating layer group ING1 and the second insulating layer group ING2 may be distinguished. In the present embodiment, all of the inorganic insulating layers corresponding to an area of the first trench TCH1 are removed, but in an embodiment of the present invention, some inorganic insulating layers may remain. In this case, the remaining inorganic insulating layers may include a slit to disperse a bending stress.

A second pattern IST1b of the first sensing line IST1 may extend on the planarization layer FLT and may be electrically connected to the first pad PDE1. In the present embodiment, the second pattern IST1b may be formed of the same material and through the same process as those of the first connection pattern CNP1.

A first line protective layer LPL1 may cover the planarization layer FLT and the second pattern IST1b, and a second line protective layer LPL2 may be disposed on the first line protective layer LPL1. In addition, a second line protective layer LPL2 may cover the first line protective layer LPL1. According to an embodiment of the present invention, a configuration of the second line protective layer LPL2 may be omitted. The first and second line protective layers LPL1 and LPL2 may be formed of an organic material. Each of the first and second line protective layers LPL1 and LPL2 may correspond to any one of the first via layer VIA1, the second via layer VIA2, and the pixel defining layer PDL. For example, when the first line protective layer LPL1 is formed of the same material and through the same process as those of the first via layer VIA1, the second line protective layer LPL2 may be formed of the same material and through the same process as those of the second via layer VIA2 or the pixel defining layer PDL. In an example, when the first line protective layer LPL1 is formed of the same material and through the same process as those of the second via layer VIA2, the second line protective layer LPL2 may be formed of the same material and through the same process as those of the pixel defining layer PDL.

The first and second line protective layers LPL1 and LPL2 and the first sensing insulating layer ISI1 may include a first opening OPN1 that exposes the second pattern IST1b.

The first pattern IST1a may be connected to the second pattern IST1b through the first opening OPN1. According to the present embodiment, a height of the first pattern IST1a, which is positioned on one end of the first insulating layer group ING1 and the planarization layer FLT, may be greater than a height of the second pattern IST1b, which is positioned on the planarization layer FLT corresponding to the first trench TCH1.

Therefore, the first pattern IST1a and the second pattern IST1b may be directly connected to each other without another bridge line. Since a bridge line is not present, connection reliability between the first pattern IST1a and the second pattern IST1b is increased. In addition, since a length of the non-display area NDA may be reduced by a length of the bridge line, a dead space may be reduced and a relatively thin bezel may be implemented.

A third pattern IST1c of the first sensing line IST1 may connect the first pad PDE1 and the second pattern ISTb to each other. The third pattern IST1c may be formed of the same material and through the same process as those of the gate electrode GE of the transistor. According to an embodiment of the present invention, the third pattern IST1c may be formed of the same material and through the same process as those of the upper electrode UE. According to an embodiment of the present invention, odd-numbered third pattern IST1c may be formed of the same material and through the same process as those of the gate electrode GE of the transistor, and even-numbered third pattern IST1c may be formed of the same material and through the same process as those of the upper electrode UE. In addition, the even-numbered third pattern IST1c may be formed of the same material and through the same process as those the gate electrode GE of the transistor, and the odd-numbered third pattern IST1c may be formed of the same material and through the same process as those of the upper electrode UE. Therefore, a problem of short circuit between adjacent lines may be more efficiently prevented.

The second insulating layer group ING2 may include a second opening OPN2 that exposes the third pattern IST1c. In addition, the planarization layer FLT may include an opening corresponding to the second opening OPN2. The second pattern IST1b may be connected to the third pattern IST1c through the second opening OPN2.

Figure 24:
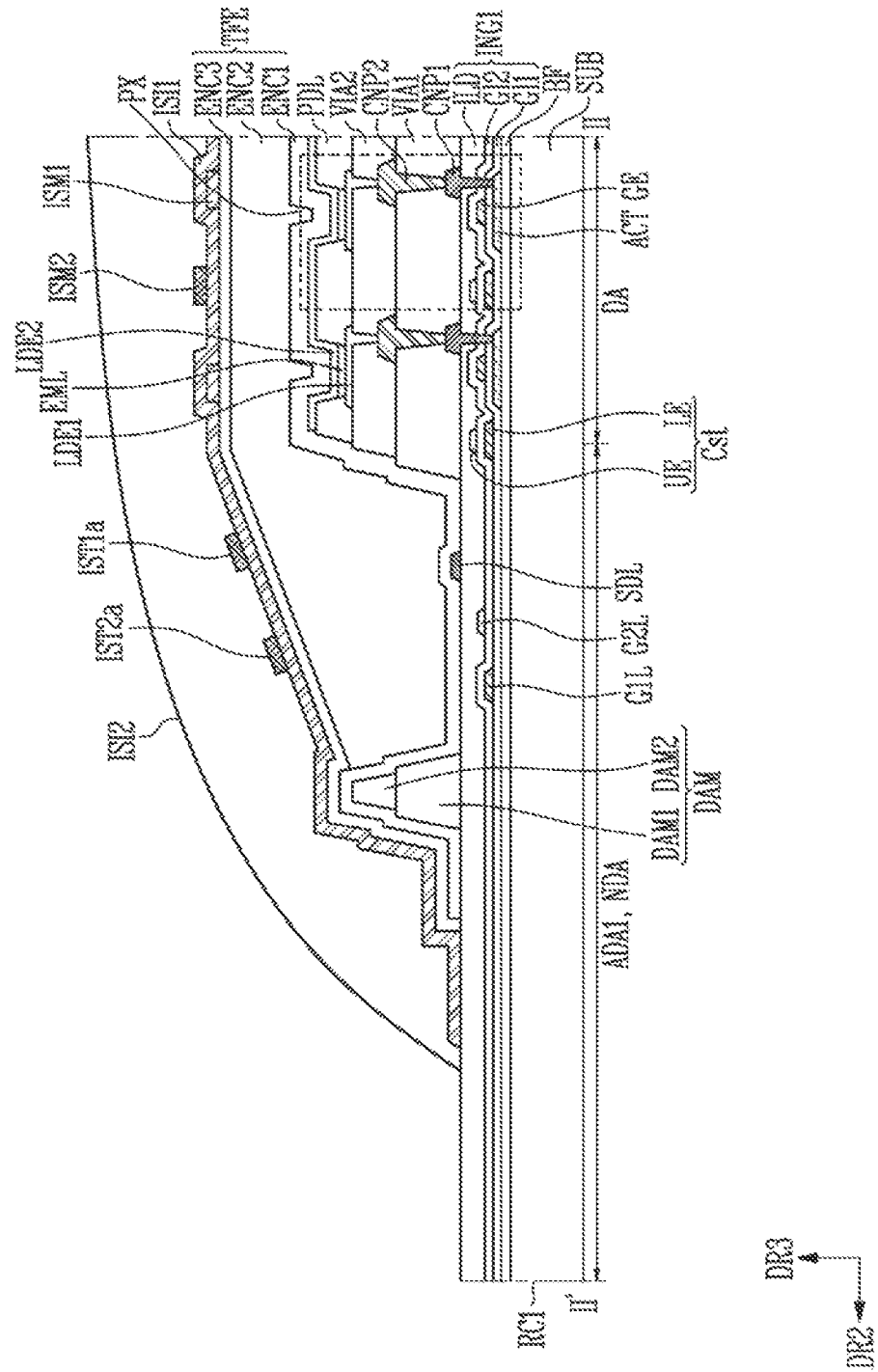

FIG. 24 is a cross-section taken along a line II-II' of FIG. 22, according to an embodiment of the present invention. The line II-I' of FIG. 22 may correspond to the first bending axis BX1. However, the same embodiment may be applied to the second side RC2 as well as the first side RC1.

The display lines DST may be configured of a single layer line or a multiple layer line using at least one of lines G1L, G2L, and SDL. The line G1L may be formed of the same material and through the same process as those of the gate electrode GE. The line G2L may be formed of the same material and through the same process as those of the upper electrode UE. The line SDL may be formed of the same material and through the same process as those of the first connection pattern CNP1.

The patterns IST1a and IST12a of the sensing lines IST1 and IST2 may be positioned on the encapsulation layer TFE and the first sensing insulating layer ISI1 (in the third direction DR3) and may be positioned between the dam DAM and the display area DA (in the second direction DR2). The first sensing insulating layer ISI1 may be positioned between the encapsulation layer TFE and the sensing lines IST1 and IST2.

Figure 25:
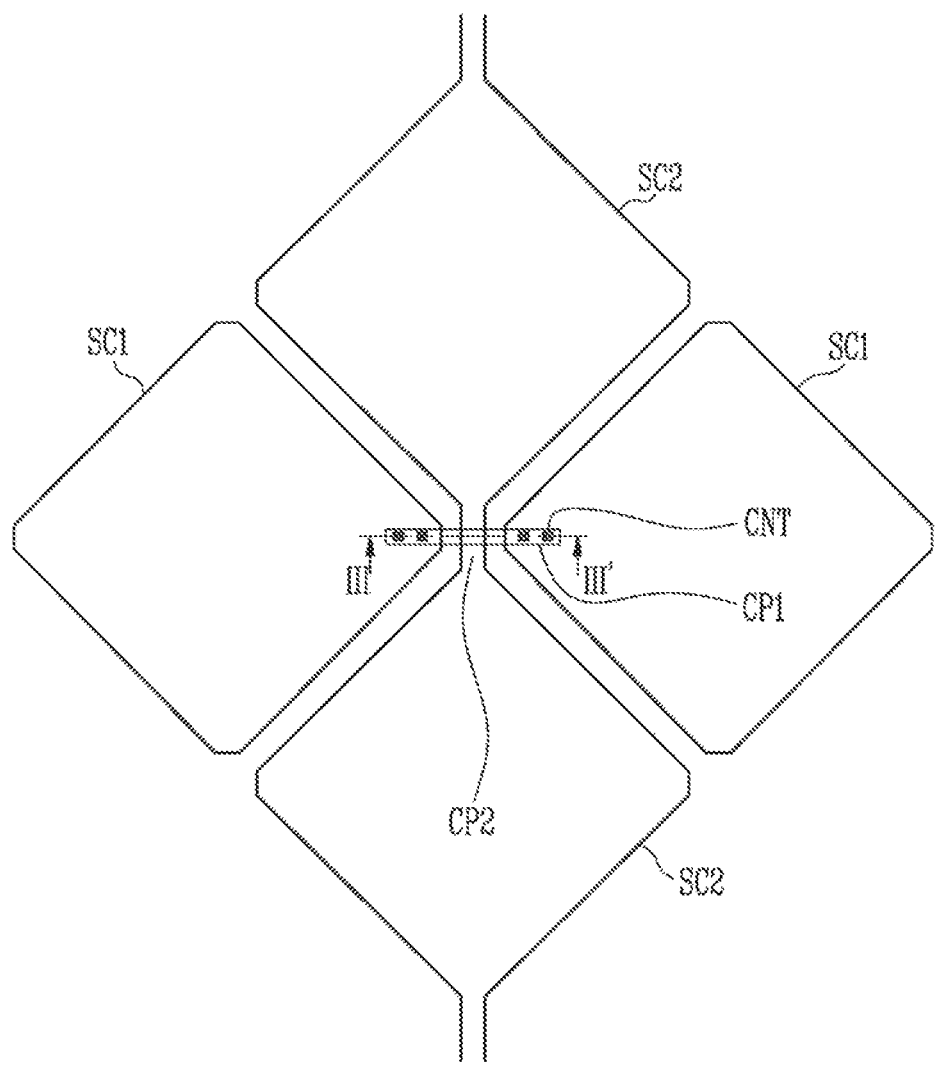
Figure 26:
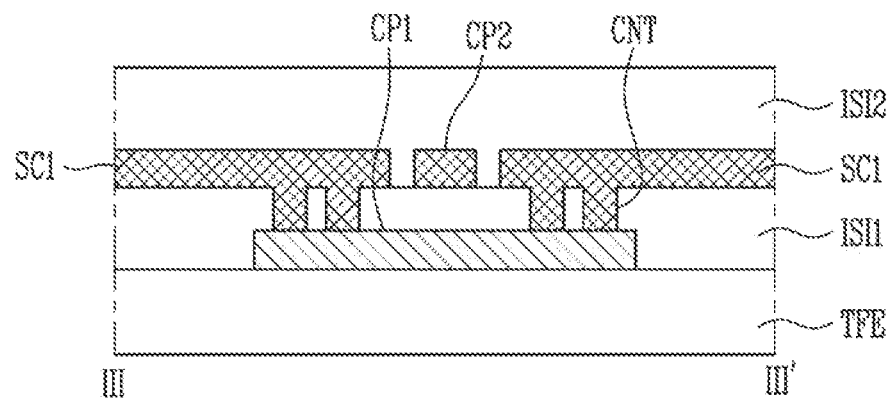

FIGS. 25 and 26 are diagrams illustrating sensing electrodes and bridge electrodes according to an embodiment of the present invention. FIG. 26 is a cross-sectional view taken along a line III-III' of FIG. 25.

The bridge electrodes CP1 may be positioned on the encapsulation layer TFE by patterning the first sensing electrode layer ISM1.

The first sensing insulating layer ISI1 may cover the bridge electrodes CP1 and may include contact holes CNT exposing a portion of the bridge electrodes CP1. The first sensing electrodes SC1 and the second sensing electrodes SC2 may be formed on the first sensing insulating layer ISI1 by patterning the second sensing electrode layer ISM2. The first sensing electrodes SC1 may be connected to the bridge electrodes CP1 through the contact holes CNT.

The second sensing electrodes SC2 may have a connection pattern CP2 in the same layer by patterning the second sensing electrode layer ISM2. Therefore, in connecting the second sensing electrodes SC2, a separate bridge electrode may be unnecessary.

According to an embodiment of the present invention, each of the sensing electrodes SC1 and SC2 may cover the plurality of pixels PX. In addition, when each of the sensing electrodes SC1 and SC2 is configured of an opaque conductive layer, each of the sensing electrodes SC1 and SC2 may include a plurality of openings capable of exposing the plurality of covered pixels PX. For example, each of the sensing electrodes SC1 and SC2 may be configured in a mesh shape. When each of the sensing electrodes SC1 and SC2 is configured of a transparent conductive layer, each of the sensing electrodes SC1 and SC2 may be configured in a plate shape that does not include an opening.

Figure 27:
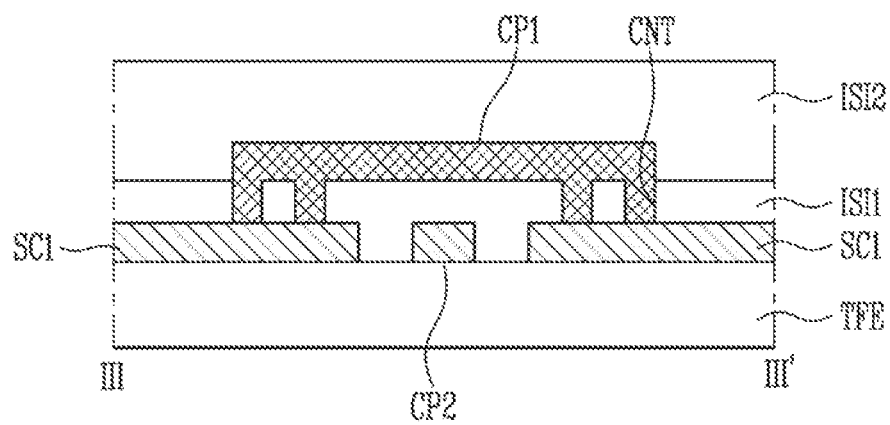

FIG. 27 is a diagram illustrating sensing electrodes and bridge electrodes according to an embodiment of the present invention. FIG. 27 is a cross-sectional view taken along the line III-III' of FIG. 25.

The first sensing electrodes SC1 and the second sensing electrodes SC2 may be formed on the encapsulation layer TFE by patterning the first sensing electrode layer ISM1.

The first sensing insulating layer ISI1 may cover the first sensing electrodes SC1 and the second sensing electrodes SC2 and may include contact holes CNT exposing a portion of the first sensing electrodes SC1.

The bridge electrodes CP1 may be positioned on the first sensing insulating layer ISI1 by patterning the second sensing electrode layer ISM2. The bridge electrodes CP1 may be connected to the first sensing electrodes SC1 through the contact holes CNT.

While the present invention has been particularly shown and described with reference to embodiments thereof, it will be apparent those of ordinary skill in the art that various changes in form and detail may be made thereto without departing from spirit and scope of the present invention.

What is claimed is:

1. A driving circuit comprising:
    a display driver configured to generate a vertical synchronization signal; and
    a sensor driver configured to determine a driving frequency by using the vertical synchronization signal,
    wherein a pulse polarity of the vertical synchronization signal is inverted when the driving frequency is changed.

2. The driving circuit of claim 1, wherein the display driver comprises:
    a display oscillator configured to generate a display clock signal; and
    a signal generator configured to generate the vertical synchronization signal by using a control signal that is supplied from an outside and the display clock signal.

3. The driving circuit of claim 1, wherein the pulse polarity of the vertical synchronization signal is changed from a logic high level to a logic low level when the driving frequency is changed from a first frequency to a second frequency, and
    the pulse polarity of the vertical synchronization signal is changed from a logic low level to a logic high level when the driving frequency is changed from the second frequency to a third frequency.

4. The driving circuit of claim 1, wherein a width of a first pulse is controlled in response to the changed driving frequency when the pulse polarity of the vertical synchronization signal is inverted.

5. The driving circuit of claim 4, wherein the width of the first pulse is set to be wider as the driving frequency increases.

6. The driving circuit of claim 4, wherein the width of the first pulse is set to be narrower as the driving frequency increases.

7. The driving circuit of claim 4, wherein the sensor driver comprises:
    a polarity determining circuit configured to determine the pulse polarity of the vertical synchronization signal;
    a frequency determining circuit configured to generate a counting signal by counting the width of the first pulse when the polarity determining circuit determines that the pulse polarity of the vertical synchronization signal is inverted;
    a touch controller configured to determine the driving frequency by using at least one of the pulse polarity of the vertical synchronization signal determined by the polarity determining circuit or a count value included in the counting signal, and generate signals corresponding to the driving frequency; and
    a sensor oscillator configured to supply a sensor clock signal to the frequency determining circuit.

8. The driving circuit of claim 7, wherein the polarity determining circuit generates a maintenance control signal when the pulse polarity of the vertical synchronization signal is maintained, and generates a change control signal when the pulse polarity of the vertical synchronization signal is inverted.

9. The driving circuit of claim 8, wherein the frequency determining circuit generates the counting signal when the change control signal is input.

10. The driving circuit of claim 8, wherein the touch controller determines that the driving frequency is the same as before when the maintenance control signal is input, and determines a changed driving frequency by using the count value when the counting signal is input.

11. A display device comprising:
    a display unit including pixels connected to scan lines and data lines;
    a sensor unit including first sensors and second sensors to sense an external input;
    a display driver configured to supply a data signal to the pixels and generate a vertical synchronization signal by using a control signal that is supplied from an outside; and
    a sensor driver configured to determine a driving frequency by using the vertical synchronization signal and supply a touch signal to at least one of the first sensors and the second sensors in response to the determined driving frequency,
    wherein a pulse polarity of the vertical synchronization signal is inverted when the driving frequency is changed.

12. The display device of claim 11, wherein the display driver comprises:
    a display oscillator configured to generate a display clock signal; and
    a signal generator configured to generate the vertical synchronization signal by using a control signal that is supplied from the outside and the display clock signal.

13. The display device of claim 11, wherein a width of a first pulse is controlled in response to the changed driving frequency when the pulse polarity of the vertical synchronization signal is inverted.

14. The display device of claim 13, wherein the width of the first pulse is set to be wider as the driving frequency increases.

15. The display device of claim 13, wherein the width of the first pulse is set to be narrower as the driving frequency increases.

16. The display device of claim 13, wherein the sensor driver comprises:
    a polarity determining circuit configured to determine the pulse polarity of the vertical synchronization signal;
    a frequency determining circuit configured to generate a counting signal by counting the width of the first pulse when the polarity determining circuit determines that the pulse polarity of the vertical synchronization signal is inverted;
    a touch controller configured to determine the driving frequency by using at least one of the pulse polarity of the vertical synchronization signal that is determined by the polarity determining circuit and a count value included in the counting signal; and
    a sensor oscillator configured to supply a sensor clock signal to the frequency determining circuit.

17. The display device of claim 16, wherein the touch controller determines a changed driving frequency by using the count value when the counting signal is input.

18. A method of driving a display device, the method comprising:

generating, by using a display driver, a vertical synchronization signal, of which a pulse polarity is inverted when a driving frequency is changed, wherein the display driver drives pixels that are included in a display unit; and receiving, by using a sensor driver, the vertical synchronization signal from the display driver, and determining the driving frequency by using a width of a first pulse when the pulse polarity of the vertical synchronization signal is inverted, wherein the sensor driver drives sensors that are included in a sensor unit.

19. The method of claim 18, wherein the width of the first pulse is set to be wider as the driving frequency increases.

20. The method of claim 18, wherein the width of the first pulse is set to be narrower as the driving frequency increases.

\* \* \* \* \*